United States Patent
Krug et al.

(10) Patent No.: US 9,765,707 B2
(45) Date of Patent: *Sep. 19, 2017

(54) DUAL FUEL SUPPLY SYSTEM FOR AN INDIRECT-INJECTION SYSTEM OF A DIESEL ENGINE

(75) Inventors: Uwe Alexander Krug, Criesbach (DE); Will Fisher, Brisbane (AU)

(73) Assignee: DGC INDUSTRIES PTY LTD, Melbourne (AU)

( * ) Notice: Subject to any disclaimer, the term of this patent is extended or adjusted under 35 U.S.C. 154(b) by 1032 days.

This patent is subject to a terminal disclaimer.

(21) Appl. No.: 13/264,147

(22) PCT Filed: Apr. 20, 2010

(86) PCT No.: PCT/AU2010/000450
§ 371 (c)(1),
(2), (4) Date: Feb. 6, 2012

(87) PCT Pub. No.: WO2010/121306
PCT Pub. Date: Oct. 28, 2010

(65) Prior Publication Data
US 2012/0145126 A1    Jun. 14, 2012

(30) Foreign Application Priority Data

Apr. 20, 2009  (AU) ................................ 2009901676

(51) Int. Cl.
*F02D 19/06* (2006.01)
*F02D 41/00* (2006.01)
(Continued)

(52) U.S. Cl.
CPC ..... *F02D 19/0665* (2013.01); *F02D 19/0615* (2013.01); *F02D 19/0628* (2013.01);
(Continued)

(58) Field of Classification Search
CPC ............. F02D 19/0644; F02D 19/0642; F02D 19/0628; F02D 19/0684; F02D 19/0665;
(Continued)

(56) References Cited

U.S. PATENT DOCUMENTS 2,767,691 A * 10/1956 Mengelkamp ............ F02B 7/00
123/1 A
2,940,435 A *  6/1960 Nemec ................ F02D 19/0684
123/575

(Continued)

FOREIGN PATENT DOCUMENTS

AU    WO 2008/036999 A1 *  4/2008
AU    WO 2008/141390 A1 *  5/2008
(Continued)

OTHER PUBLICATIONS

Canadian Examination Report issued in corresponding Canadian Patent Application No. 2,758,737 mailed Feb. 24, 2016.

*Primary Examiner* — Sizo Vilakazi
*Assistant Examiner* — Brian Kirby
(74) *Attorney, Agent, or Firm* — Davis & Bujold PLLC; Michael J. Bujold

(57) ABSTRACT

The present invention relates to fuel systems for diesel engines. In particular, the invention relates to a dual fuel supply system (10) for a diesel engine having an indirect-injection system (12). The invention extends to a diesel engine incorporating the dual fuel supply system (10) and to a vehicle that incorporates a diesel engine having the dual fuel supply system (10). The dual-fuel supply system (10) includes a mixed fuel supply system (17) that includes a first stage (14) having a diesel tank (42) and LPG tank (44), and as second stage (16) to supply the fuel mixture to the injection system (12). The dual-fuel supply system (10) also includes diesel supply system (80) for delivering diesel to the injection system (12). Moreover, the dual fuel system
(Continued)

(10) is configured to permit selective change over between the diesel supply system (80) and the mixed fuel system (17) to supply the injection system (12) selectively with either diesel or liquid fuel mixture respectively.

18 Claims, 10 Drawing Sheets

(51) Int. Cl.
F02M 31/20 (2006.01)
F02D 19/08 (2006.01)
F02B 3/06 (2006.01)

(52) U.S. Cl.
CPC ..... *F02D 19/0647* (2013.01); *F02D 19/0684* (2013.01); *F02D 19/082* (2013.01); *F02D 41/0027* (2013.01); *F02M 31/20* (2013.01); *F02B 3/06* (2013.01); *F02D 19/0649* (2013.01); *Y02T 10/126* (2013.01); *Y02T 10/36* (2013.01)

(58) Field of Classification Search
CPC ............. F02D 19/0647; F02D 19/0649; F02D 19/082; F02D 41/0027; F03D 19/0639; Y02T 10/126; Y02T 10/36; F02B 3/06; F02M 31/20
USPC ... 123/447, 27 GE, 299, 300, 304, 525–527, 123/575–578
See application file for complete search history.

(56) References Cited

U.S. PATENT DOCUMENTS

| | | | | |
|---|---|---|---|---|
| 4,489,700 A * | 12/1984 | van der Weide | .. | F02M 21/0212 123/452 |
| 4,535,728 A * | 8/1985 | Batchelor | ............... | F02B 43/00 123/27 GE |
| 4,606,322 A * | 8/1986 | Reid | .................... | F02D 19/0684 123/458 |
| 4,953,515 A * | 9/1990 | Fehr | ........................ | F02B 7/06 123/383 |
| 5,033,444 A * | 7/1991 | Kaufman | ............... | F02B 43/00 123/1 A |
| 5,379,740 A * | 1/1995 | Moore | ................ | F02D 19/0605 123/27 GE |
| 5,797,378 A * | 8/1998 | Kato | .................... | F02B 61/045 123/198 E |
| 5,967,126 A * | 10/1999 | Ofner | ................. | F02M 21/0212 123/525 |
| 6,003,478 A * | 12/1999 | Huber | ....................... | F02B 7/06 123/27 GE |
| 6,035,837 A * | 3/2000 | Cohen | ................ | F02D 19/0628 123/27 GE |
| 6,234,151 B1 * | 5/2001 | Eck | ....................... | F02M 31/20 123/514 |
| 6,513,505 B2 * | 2/2003 | Watanabe | ............... | F02D 19/12 123/25 R |
| 6,626,162 B2 * | 9/2003 | Shelor | ................... | F02D 33/003 123/541 |
| 7,207,321 B2 * | 4/2007 | Vadimovitch | ........... | C10L 1/023 123/27 GE |
| 7,222,015 B2 * | 5/2007 | Davis | .................... | F02D 19/027 701/103 |
| 7,444,986 B2 * | 11/2008 | Shute | .................... | F02D 19/081 123/27 GE |
| 7,509,209 B2 * | 3/2009 | Davis | .................... | F02D 19/027 123/689 |
| 7,789,047 B2 * | 9/2010 | Kuroki | ...................... | C01B 3/02 123/1 A |
| 8,220,439 B2 * | 7/2012 | Fisher | ................. | F02D 19/0647 123/304 |
| 8,245,695 B2 * | 8/2012 | Martin | ............... | F02D 19/0647 123/446 |
| 8,783,281 B2 * | 7/2014 | Carter | ................ | F02M 21/0212 123/304 |
| 8,905,006 B2 * | 12/2014 | Jaasma | ............... | F02D 19/0647 123/525 |
| 9,222,676 B2 * | 12/2015 | Roesler | ..................... | F02C 9/28 |
| 2005/0188961 A1 * | 9/2005 | Devall | ................. | F02M 31/205 123/514 |
| 2006/0124113 A1 * | 6/2006 | Roberts | .................. | F02M 31/20 123/541 |
| 2006/0225800 A1 * | 10/2006 | Weber | .................... | F02M 55/04 138/31 |
| 2007/0079815 A1 * | 4/2007 | Shinkarenko | .......... | F02M 31/20 123/525 |
| 2007/0175459 A1 * | 8/2007 | Williams | ............ | F02D 19/0605 123/575 |
| 2008/0245318 A1 * | 10/2008 | Kuroki | ...................... | C01B 3/02 123/3 |
| 2009/0320786 A1 * | 12/2009 | Fisher | ................. | F02D 19/0647 123/27 GE |
| 2010/0126468 A1 * | 5/2010 | Martin | ............... | F02D 19/0647 123/447 |
| 2010/0236527 A1 * | 9/2010 | Wang | .................. | F02D 41/3836 123/456 |
| 2011/0168132 A1 * | 7/2011 | Pursifull | ................. | F02M 43/00 123/446 |

FOREIGN PATENT DOCUMENTS

| | | | | |
|---|---|---|---|---|
| DE | 102004011414 A1 * | 4/2005 | ............. | F02M 43/00 |
| DE | 102007028816 A1 | 5/2008 | | |
| DE | 102007051677 A1 * | 4/2009 | ........ | F02D 19/0647 |
| EP | 1785618 A1 | 5/2007 | | |
| JP | 57153933 A * | 9/1982 | ............. | F02D 19/06 |
| JP | 59162337 A * | 9/1984 | ........ | F02D 19/0647 |
| JP | 3189361 A | 8/1991 | | |
| JP | 2002161821 A * | 6/2002 | ........... | Y02T 10/123 |
| WO | 2008/036999 A1 | 4/2008 | | |
| WO | WO2008/036999 A1 * | 4/2008 | | |
| WO | 2008/141390 A1 | 11/2008 | | |
| WO | WO2008/141390 A1 * | 11/2008 | | |
| WO | WO2008/141390 A1 * | 11/2008 | ............. | F02M 21/02 |

* cited by examiner

DUAL FUEL SUPPLY SYSTEM FOR AN INDIRECT-INJECTION SYSTEM OF A DIESEL ENGINE

FIELD OF INVENTION

The present invention relates to fuel systems for diesel engines. In particular, the invention relates to a dual fuel supply system for a diesel engine having an indirect-injection system. The invention extends to a diesel engine incorporating the dual fuel supply system and to a vehicle that incorporates a diesel engine having the dual fuel supply system.

This invention relates particularly but not exclusively to a dual fuel supply system for diesel engines of trucks. It will therefore be convenient hereinafter to describe the invention with reference to this example application. However, at the same time it must be recognized that the invention applies to other applications such as to diesel engines for light vehicles and to other types of internal combustion engines.

BACKGROUND TO THE INVENTION

Dual fuel supply systems for supplying a fuel mixture of diesel and gaseous fuel to diesel engines are known. Some dual fuel supply systems introduce the gaseous fuel into the air supply that leads to the combustion chamber. In US2005202021 a separate set of injectors introduce gaseous LPG into the combustion chamber, whereas in U.S. Pat. No. 5,408,957, U.S. Pat. No. 4,520,766 and GB1252458, gaseous LPG is mixed with air prior to introducing the air mixture to the combustion chamber.

The use of LPG and diesel at the same time has recently been addressed by the dual fuel system disclosed in WO 2008036999 where liquid LPG and diesel were mixed in a chamber prior to being introduced into the combustion chambers. However there are problems associated with the dual fuel system disclosed in WO 2008036999 in its application with different engine types.

OBJECT OF THE INVENTION

It is an object of the present invention to provide an alternative dual fuel supply system suitable for indirect-injection systems that overcomes at least in part the problems associated with prior art dual fuel supply systems.

SUMMARY OF THE INVENTION

In a first aspect the invention provides a dual fuel supply system for supplying fuel to an indirect-injection system of a diesel engine, the dual fuel supply system including:

a diesel supply system to supply diesel to the indirect-injection system; and a mixed fuel supply system that is operatively able to supply a liquid fuel mixture of diesel and liquefied gaseous fuel to the indirect-injection system at a supply pressure within a fuel demand pressure range of the indirect-injection system and at a corresponding temperature range that retains the fuel mixture below its vapor temperature as it flows through the fuel path of the indirect-injection system and the diesel engine, in which the dual fuel supply system is configured to permit selective change over between the diesel supply system and the mixed fuel system to supply the indirect-injection system selectively with either diesel or liquid fuel mixture respectively.

The diesel supply system is preferably operatively able to supply diesel to the indirect-injection system at a supply pressure within the fuel demand pressure range of the indirect-injection system and at a supply temperature range that corresponds with the supply temperature range of the mixed fuel supply system.

The mixed fuel supply system is preferably configured to regulate the supply pressure of the liquid fuel mixture within a pressure range towards a high end of the fuel demand pressure range of the indirect-injection system.

The mixed fuel supply system is preferably configured to supply the fuel mixture at a supply temperature that is sufficiently lower than the vapor temperature of the liquid fuel mixture at the supply pressure to compensate for heat that is introduced into the liquid fuel mixture by engine heat as it flows through the fluidic fuel path of the indirect-injection system and the diesel engine.

The mixed fuel supply system preferably includes a first stage and a second stage, and in which the second stage of the mixed fuel supply system is configured to regulate the supply pressure and the supply temperature at which the liquid fuel mixture is supplied to the indirect-injection system.

The mixed fuel supply system is preferably configured to trigger the first stage of the mixed fuel supply system to supply liquid fuel mixture to the second stage of the mixed fuel supply system when the supply pressure in the second stage of the mixed fuel supply system drops towards a low end of the fuel demand pressure range of the indirect-injection system.

The second stage of the mixed fuel supply system preferably includes a pressure accumulator, and in which the first stage of the mixed fuel supply system is triggered to charge the pressure accumulator with fuel mixture when the supply pressure in the second stage of the mixed fuel supply system drops towards a low end of the fuel demand pressure range of the indirect-injection system.

The second stage of the mixed fuel supply system preferably includes a mixed fuel supply circulation line that defines a mixed fuel supply circulation flow path that is connected or connectable inline in flow circulation with a fuel rail of the indirect-injection system.

The mixed fuel supply circulation line preferably defines a mixed fuel supply circulation flow path that has a flow path volume to accommodate at least the amount of liquid fuel mixture that the diesel engine consumes at full load for one minute.

The second stage of the mixed fuel supply system preferably includes a circulation pump inline the mixed fuel supply circulation line. The circulation pump is preferably a variable speed controlled pump.

The second stage of the mixed fuel supply system preferably includes at least one fuel cooler inline the mixed fuel supply circulation line upstream from the indirect injection-system and downstream from the circulation pump.

The second stage of the mixed fuel supply system preferably includes at least one fuel cooler inline the mixed fuel supply circulation line downstream from the indirect-injection system and upstream from the circulation pump.

The at least one fuel cooler preferably includes an evaporator through which a refrigerant is passed, and a shut-off valve to shut-off the flow of refrigerant thought the evaporator.

The second stage of the mixed fuel supply system preferably includes a temperature sensor upstream from the indirect-injection system, to measure the supply temperature of the liquid fuel mixture that is supplied to the indirect-injection system.

The second stage of the mixed fuel supply system preferably includes a temperature sensor downstream from the indirect-injection system, to measure a temperature of the liquid fuel mixture that discharges from the indirect-injection system into to the mixed fuel supply circulation line.

The second stage of the mixed fuel supply system preferably includes a flow sensor to measure a flow rate of liquid fuel mixture circulating through the mixed fuel supply circulation line.

The second stage of the mixed fuel supply system preferably includes a fuel mixer inline the mixed fuel supply circulation line, which fuel mixer defines a mixing-chamber that is in flow communication with the mixed fuel circulation supply flow path. The mixed fuel pressure accumulator is preferably a bladder accumulator.

The second stage of the mixed fuel supply system preferably includes at least one pressure sensor upstream from the indirect-injection system to measure the supply pressure of the liquid fuel mixture being supplied to the indirect-injection system.

The second stage of the mixed fuel supply system preferably includes a mixed fuel supply line to connect the first stage the mixed fuel supply system in flow communication with the second stage of mixed fuel supply system, and in which the mixed fuel supply line joins the mixed fuel supply circulation line upstream from the circulation pump that is inline the mixed fuel supply circulation line.

The second stage of the mixed fuel supply system preferably includes a pressure regulating valve inline the mixed fuel supply line.

The second stage of the mixed fuel supply system preferably includes a dual cooler inline the mixed fuel supply line.

The second stage of the mixed fuel supply system preferably includes a pressure accumulator inline the mixed fuel supply line.

The first stage of the mixed fuel supply system is preferably a fuel-mixing system configured to mix diesel and liquefied gaseous fuel to form the liquid fuel mixture.

The fuel-mixing system is preferably configured to regulate a ratio of diesel to liquefied gaseous fuel of the liquid fuel mixture that is supplied to the second stage of the mixed fuel supply system at a ratio of between 10% and 50% parts per mass diesel to 90% and 50% parts per mass liquefied gaseous fuel.

The fuel-mixing system preferably includes a fuel mixer and a diesel delivery line and a liquid gaseous fuel delivery line that are connected between the fuel mixer and a diesel reservoir and a liquefied gaseous fuel reservoir respectively. The fuel-mixing system preferably includes a variable speed controlled pump inline the diesel delivery line and a variable speed controlled pump inline the liquid gaseous fuel delivery line upstream from the mixer, to regulate the ratio of diesel to liquefied gaseous fuel that is supplied to the mixer.

The fuel-mixing system preferably includes a diesel pressure accumulator inline the diesel delivery line and a liquefied gaseous fuel pressure accumulator inline the liquid gaseous fuel delivery line.

The diesel pressure accumulator preferably includes a diesel bladder accumulator and the liquefied gaseous fuel pressure accumulator includes liquefied gaseous fuel bladder accumulator.

The fuel-mixing system preferably includes a diesel booster pump inline the diesel delivery line upstream from the diesel bladder accumulator, and a liquefied gaseous fuel booster pump inline the liquid gaseous fuel delivery line upstream from the liquefied gaseous fuel bladder accumulator.

The fuel-mixing system preferably includes a proportioning valve inline the diesel delivery line downstream from the diesel bladder accumulator, and a proportioning valve inline the liquid gaseous fuel delivery line downstream from the liquefied gaseous fuel bladder accumulator.

The fuel-mixing system preferably includes a flow meter inline at least one of the diesel delivery line and the liquid gaseous fuel delivery line.

The fuel-mixing system preferably includes a fuel cooler inline the diesel delivery line and a fuel cooler inline the liquid gaseous fuel delivery line.

The second stage of the mixed fuel supply system preferably includes a mixed fuel bypass line selectively to bypass the indirect-injection system.

The diesel supply system preferably includes a diesel supply circulation line that is connected or connectable in flow communication inline with the fuel rail of the indirect-injection system.

The diesel supply system preferably includes at least one fuel cooler inline the diesel supply circulation line upstream from the indirect injection-system.

The diesel supply system preferably includes a diesel booster pump inline the diesel supply circulation line upstream from the at least one fuel cooler.

The diesel supply system preferably includes a diesel bypass selectively to bypass the indirect-injection system.

The dual fuel supply system preferably includes a controller that is configured to control selectively the change over between the diesel supply system and the mixed fuel supply system.

The controller is preferably configured to flush the mixed fuel supply line with diesel before switching over from the mixed fuel supply system to the diesel system.

The controller is preferably configured to flush the mixed fuel supply line with diesel after the fuel-mixing system charged the second stage of the mixed fuel supply system with liquid fuel mixture.

The controller is preferably configured to flush the mixed fuel supply line with diesel before the diesel engine is stopped.

The controller is preferably configured to regulate the flow rate of the fuel mixture through the at least one fuel cooler in the mixed fuel supply circulation line to regulate the temperature of the fuel mixture.

The controller is preferably configured to open the diesel supply circulation line prior to opening the mixed fuel bypass line.

The controller is preferably configured to open the mixed fuel supply circulation line prior to opening the diesel bypass line.

The controller is preferably configured automatically to change over from the mixed fuel supply system to the diesel supply system when the pressure in the mixed fuel supply circulation loop drops below a set pressure threshold.

The controller is preferably configured to regulate a temperature of the liquefied gaseous fuel and the diesel fuel prior to mixing at temperatures that are sufficiently lower than the vapor temperature of the liquefied gaseous fuel at the mixing pressure, to compensate for heat that is added to the fuel mixture during mixing and when flowing to the mixed fuel supply circulation line.

The controller is preferably configured to monitor the temperature of the liquid fuel mixture in the mixed fuel supply circulation line, and to switch over to the diesel supply system if the temperature rises above a set temperature threshold.

The controller is preferably configured to monitor the temperature in the mixed fuel bypass line, and if the temperature of the liquid fuel mixture in the mixed fuel bypasses line is above a set temperature threshold then to resist switching over from the diesel supply system to the mixed fuel supply system.

The controller is preferably configured to monitor the supply temperature of the diesel, and if the supply temperature of the diesel is above a set temperature threshold then to resists change over to the mixed fuel supply system.

The controller is preferably configured to trigger an alarm if the flow rate of diesel in the diesel supply circulation line or the flow rate of fuel mixture in the mixed fuel circulation line is below a set flow rate threshold.

The controller is preferably configured to alter the ratio of diesel to liquefied gaseous fuel to alter the vapor temperature of the fuel mixture at the supply pressure.

In a second aspect the invention provides a diesel engine that includes:

an indirect-injection system; and a dual fuel supply system as defined in the first aspect of the invention.

The dual fuel supply system preferably includes any one or more of the optional features as defined above in accordance with the first aspect of the invention.

In a third aspect the invention provides to a vehicle that includes:

a diesel engine having an indirect-injection system; and a dual fuel supply system as defined in the first aspect of the invention.

The dual fuel supply system preferably includes any one or more of the optional features as defined above in accordance with the first aspect of the invention.

In a fourth aspect the present invention broadly resides in a dual fuel supply system for use by a low pressure internal combustion diesel engine including a fuel tank to store pressurized liquefied gas;

a proportioning valve means operatively connected to the fuel tank and adapted to control the flow of the liquefied gas;

a mixing chamber operatively connected to the proportioning valve and adapted to mix a proportioned flow of the liquefied gas and a proportioned flow of diesel to form a liquid fuel mixture; and a cooler to maintain the liquid fuel mixture at a temperature less than standard room temperature during mixing or subsequent to the mixing of the liquid fuel temperature; wherein the liquid fuel mixture is under pressure within the range of 80 to 150 psi and cooled within the range of 0.5° C. and 17° C. to maintain the fuel mixture in a liquid state, wherein the liquid fuel mixture is introduced into a combustion chamber of the diesel engine.

In a fifth aspect the invention resides in a dual fuel supply system assembly for low pressure internal combustion diesel engine including a fuel tank to store pressurized liquefied gas;

a proportioning valve means operatively connectable to the fuel tank and adapted to control the flow of the liquefied gas;

a mixing chamber operatively connectable to the proportioning valve and adapted to mix a proportioned flow of the liquefied gas and a proportioned flow of diesel to form a liquid fuel mixture, wherein in use the assembly can provide the liquid fuel mixture to a combustion chamber of the diesel engine; and a cooler to maintain the liquid fuel mixture at a temperature less than standard room temperature during mixing or subsequent to the mixing of the liquid fuel temperature; wherein the liquid fuel mixture is under pressure within the range of 80 to 150 psi and cooled within the range of 0.5° C. and 17° C. to maintain the fuel mixture in a liquid state, wherein the liquid fuel mixture is introduced into a combustion chamber of the diesel engine.

The mixing chamber is preferably a swirl chamber or a junction where the two different fuel sources met and mix.

The proportioning valve means preferably includes a flow control valve operatively controlled by an electronic control board. The electronic control board preferably controls the flow control valve in response to processed information from the vehicle electronic control unit.

Preferably the diesel fuel is pressurized prior to entering the mixing chamber. The diesel fuel is preferably pressurized by an inline pump and the fuel is stored within a pressurized tank prior to use. The pressure of the diesel fuel is preferably substantially similar to the pressure of the liquefied gas in the mixing chamber.

Preferably the supply of pressurized diesel fuel to the mixing chamber is regulated by a flow control valve that is operatively controlled by an electronic control board. The electronic control board is preferably controlled by the vehicle electronic control unit that receives and processes information to provide a relevant signal to the electronic control board.

The liquefied gas is preferably filtered before the proportioning valve with an inline filter.

Preferably the LPG tank, proportioning valve means and mixing chamber are linked by a gas pipeline.

The pipeline between the LPG tank and proportioning valve preferably includes at least one closeable valve. In a preferred embodiment there is a one-way non-return valve and a closeable valve within the line between the LPG tank and the proportioning valve means.

The dual fuel assembly is preferably fitted prior to delivery of a diesel engine vehicle or fitted as an after market kit.

The liquefied gas is preferably LPG, propane, natural gas or compressed natural gas.

Preferably the liquefied gas tank stores LPG under pressure of about 150 psi but above its vapor pressure of 80 psi.

In a sixth aspect the invention broadly resides in a low pressure internal combustion diesel engine with a dual fuel supply system including a first tank to store pressurized liquefied gas;

a second tank to store pressurized diesel;

a first proportioning valve means operatively connected to the first tank and adapted to control the flow of the liquefied gas;

a second proportioning valve means operatively connected to the second tank and adapted to control the flow of the diesel;

a mixing chamber operatively connected to the first proportioning valve means and second proportioning valve means, said mixing chamber is adapted to mix a proportioned flow of the liquefied gas and a proportioned flow of diesel to form a liquid fuel mixture, a cooler to maintain the liquid fuel mixture at a temperature less than standard room temperature during mixing or subsequent to the mixing of the liquid fuel temperature; wherein the liquid fuel mixture is under pressure within the range of 80 to 150 psi and cooled within the range of 0.5° C. and 17° C. to maintain the fuel mixture in a liquid state, and distribution means for distributing the liquid fuel mixture to each internal combustion chamber, wherein an engine processor controls the proportioning of the fuels by regulating the respective proportioning valve means in accordance with demand.

The abovementioned preferred embodiments for the features of the dual fuel supply system and dual fuel supply system assembly also apply for this aspect of the invention.

There is preferably a plurality of first and diesel fuel tanks.

The second tank preferably receives pressurized diesel via an inline filter and pump from a diesel fuel tank.

The second proportioning valve means preferably includes a flow control valve operatively controlled by an electronic control board. The electronic control board preferably controls the flow control valve in response to processed information from the vehicle electronic control unit. The vehicle electronic control unit receives and processes input regarding the demand of fuel by the engine.

The ratio of LPG to diesel may vary between 50:50 and 90:10 respectively. More preferably the ratio of LPG to diesel is approximately 70:30 respectively. Preferably any ratio is suitable providing the engine components are not prematurely worn because of lack of lubricity and the manufacturer's warranties are not voided and the calorific value of the fuel is sufficient to allow the engine to produce an acceptable amount of power and torque.

The cooler serves as a cooling system and preferably uses an accepted refrigerant to maintain the desired temperature. In one embodiment refrigerant from the air conditioning system is preferably circulated within the cooler.

Preferably there is a cooler after the fuels are mixed and after the fuel mixture had circulated through the common rail.

The liquid fuel mixture is preferably pumped to a common rail operable under low pressure above 80 and below 150 psi and a temperature of between 0.5° C. and 17° C. so that the liquid fuel mixture remains in a liquid state. Preferably the liquid fuel mixture is introduced into the common rail at substantially 110 psi and substantially 7° C. to 10° C.

The phrase common rail in the specification includes common rails and fuel rails. Preferably, the common rail is connected to an injector for each combustion chamber and the fuel mixture is distributed to each of the injectors for combustion in accordance with the manufacturer's specifications.

Excess unburnt fuel mixture is preferably collected in an overflow tank and returned to the mixing chamber. Excess fuel is then preferably passed through a fuel cooler and maintained under pressure in a pressurized tank for subsequent reintroduction into the mixing chamber.

Preferably there is a separate line from the diesel tank to the supply pump and subsequently to the common rail for the engine to use diesel as the sole fuel source.

Unburnt diesel (when used as a sole fuel source) is preferably returned to the diesel fuel tank for reuse.

In a seventh aspect the invention broadly resides in a method of using the above mentioned dual fuel supply system for an internal combustion diesel engine including
proportioning flow of liquefied gas from the first tank with the first proportioning valve means;
proportioning flow of diesel from the second tank with the second proportioning valve means;
mixing proportioned fuels to form a liquid fuel mixture in the mixing chamber; cooling and maintaining the liquid fuel mixture in a liquid state; and
distributing the liquid fuel mixture from the mixing chamber to each of the combustion chambers.

BRIEF DESCRIPTION OF THE DRAWINGS

In order that the present invention can be more readily understood reference will now be made to the accompanying drawings which illustrate preferred embodiments of the invention and wherein.

DETAILED DESCRIPTION OF THE PREFERRED EMBODIMENTS

Figure 1:
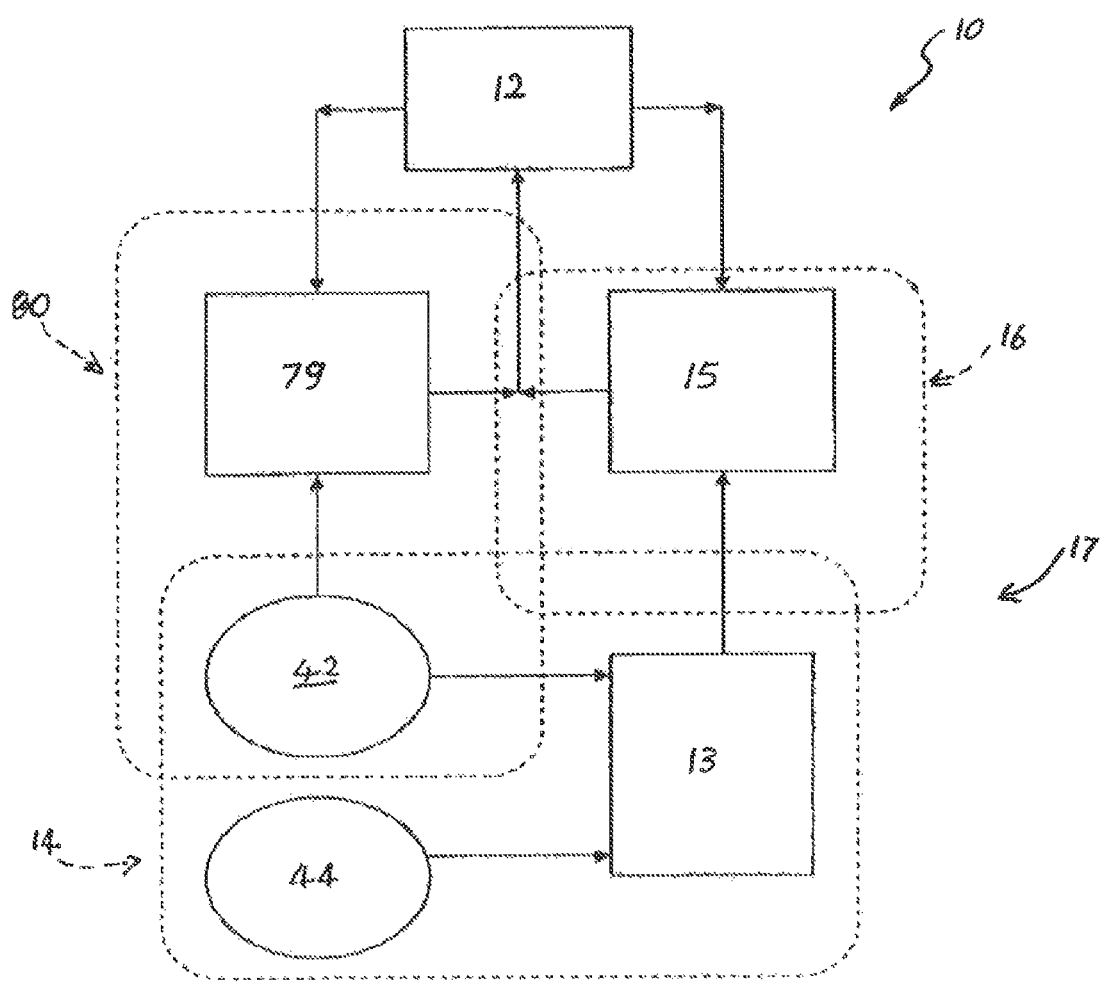
FIG. 1 is a schematic functional block diagram of A dual fuel supply system, in accordance with the invention.

Referring to FIG. 1, reference numeral 10 generally indicates a dual fuel supply system in accordance with the invention for supplying fuel to an indirect-injection system (the injection system) 12 of a diesel engine (not shown). Indirect-injection systems are generally characterized in that the injection pressure of its injectors is relatively low in comparison with direct-injection systems.

The embodiments of the dual fuel supply system described below are for supplying fuel to indirect-injection systems having relatively low fuel demand pressures, typically between 2 bar and 15 bar.

Broadly, each of the embodiments described below includes two subsystems. One sub-system is mixed fuel supply system 17 that includes a first stage 14 of the mixed fuel supply system 17 having a diesel reservoir or tank 42, a liquefied gaseous fuel reservoir or tank 44, and system components 13 for supplying a liquid fuel mixture to the second stage 16 of the mixed fuel supply system 17. The second stage 16 includes system components 15. The liquefied gaseous fuel is typically liquid petroleum gas (LPG), however, it will be appreciated that a dual fuel supply system, in accordance with the invention, can be configured for use with different types of liquefied gaseous fuel.

The mixed fuel supply system 17 is operatively able to supply the liquid fuel mixture of diesel and liquefied gaseous fuel to the indirect-injection system at a supply pressure that matches the fuel demand pressure range of the injection system 12 and at a corresponding temperature range that retains the fuel mixture below its vapor temperature as it flows through the fuel path of the indirect-injection system 12 and the diesel engine.

Another subsystem of the dual fuel supply system 10 is a diesel supply system 80 and includes the diesel tank 42 and system components 79 for delivering diesel to the injection system 12.

The dual fuel supply system 10 includes conduits or lines that define various flow paths, and system components that regulate and control the active flow paths, flow rates, temperature, and pressure of the diesel or fuel mixture through the dual fuel supply system 10, as is explained in more detail below.

Moreover, the dual fuel system 10 is configured to permit selective change over between the diesel supply system 80 and the mixed fuel system 17 to supply the injection system 12 selectively with either diesel or liquid fuel mixture respectively.

Figure 2:
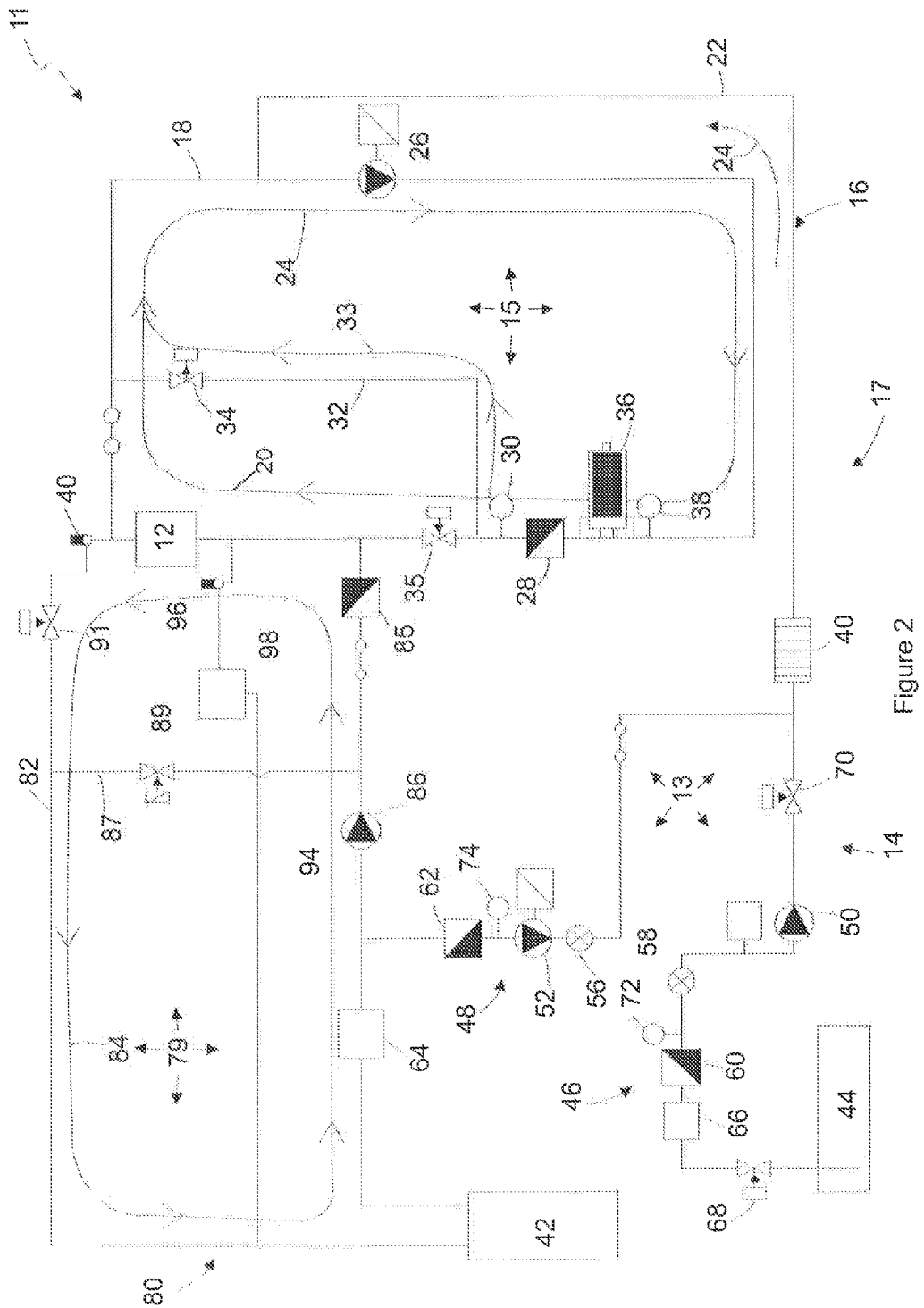
FIG. 2 is a schematic representation of a first embodiment of the dual fuel system.

FIG. 2 shows a schematic diagram of an embodiment 11 of the due-fuel supply system. The dual fuel supply system 11 includes a mixed fuel supply system 17 that includes a first stage 14 to mix diesel and LPG to form the liquid fuel mixture, and a second stage 16 to supply the injection system 12 with the fuel mixture from the first stage of 14 of the mixed fuel supply system 17. The seconds stage 16 of the mixed fuel supply system 17 forms a fuel-mixing system.

The second stage 16 of the mixed fuel supply system 17 includes a mixed fuel supply circulation line or loop 18 that defines a mixed fuel supply circulation flow path. The mixed fuel supply circulation loop 18 is connected in flow communication inline with a fuel rail or manifold of the injection system 12 for circulating fuel mixture through the fuel rail of the injection system 12.

A mixed fuel supply line 22 that defines a mixed fuel supply line flow path (see arrow 24) extends between the fuel-mixing system 14 and the mixed fuel supply circulation loop 18 to supply fuel mixture to the mixed fuel supply circulation loop 18 from the fuel-mixing system 14.

The second stage 16 of the mixed fuel supply system 17 includes a circulation pump 26 inline the mixed fuel supply circulation line 18 and a fuel cooler 28 inline the mixed fuel supply circulation loop 18 upstream from the indirect injection-system 12 and downstream from the circulation pump 26. In this embodiment, the circulation pump is a controllable variably speed pump and the fuel cooler includes an evaporator that is connect inline the refrigerant line of the air conditioning system of the truck. However, it will be appreciated that the fuel cooler can be a stand alone fuel cooler.

A temperature sensor 30 is provided upstream from the indirect-injection system 12, to measure the supply temperature of the liquid fuel mixture that is supplied to the injection system 12.

The dual fuel supply system 11 also includes a mixed fuel bypass line 32 selectively to isolate the indirect-injection system 12 from the mixed fuel supply circulation line 18 (see arrow 33).

Valves in the form of a controllable normally closed solenoid valve 35 and normally opened solenoid valve 34 are provided inline the mixed fuel circulation supply loop 18 and the bypass line 32 respectively, selectively to divert fuel mixture through either flow path 20 or 33.

The second stage 16 of the mixed fuel supply system 17 also includes a pressure accumulator 36 inline the mixed fuel circulation supply loop 18 downstream from the indirect-injection system 12 and upstream from the circulation pump 26.

The pressure accumulator 36 is in the form of a bladder accumulator.

To this end, the second stage 16 of the mixed fuel supply system 17 includes at least one pressure sensor 38 upstream from the indirect-injection system 12 to measure the supply pressure of the liquid fuel mixture being supplied to the indirect-injection system 12.

A pressure release valve 40 is provided downstream from the indirect-injection system 12. The pressure release valve has a release or crack pressure rating of between 2 bar and 15 bar (relative pressure), depending on the fuel demand pressure of the indirect-injection system.

The fuel-mixing system 14 is configured to regulate a ratio of diesel to LPG of the liquid fuel mixture that is supplied to the second stage 16 of the mixed fuel supply system 17. The ratio can be between about 10% and 50% part per mass diesel to between 90% and 50% parts per mass LPG.

Moreover, the fuel mixture is supplied to the mixed fuel circulation supply loop at a pressure of between 2.0 bar and 15.0 bar at a temperature of between −8.5° C. and +55° C. which corresponds with the temperature range and pressure range for the liquid fuel mixture in the mixed fuel circulation supply loop 18.

The fuel-mixing system 14 includes a fuel mixer 40 to receive the diesel and the LPG from a diesel supply and a LPG supply. The fuel mixer 40 can be in the form of an inline static mixer, a mixing chamber, a T- or Y-piece joint with some tubing at the outlet to allow mixing, or the like.

The diesel supply includes the diesel reservoir or tank 42 and the LPG supply includes the LPG reservoir or tank 44.

A diesel delivery line 48 and a LPG delivery line 46 are connected to the diesel tank and the LPG tank and the mixer 40 respectively.

Variable speed controlled pumps 50 and 52 are provided inline the LPG delivery line 46 and inline the diesel delivery line 48 respectively upstream from the mixer to regulate the ratio of diesel to LPG that is supplied to the fuel mixer 40.

The fuel-mixing system 14 includes flow meters 56 and 58 inline the diesel delivery line and the LPG delivery line respectively.

The fuel-mixing system 14 also includes fuel coolers 60 and 62 inline the LPG delivery line and the diesel delivery line. Temperature sensors 72 and 74 are provided inline the LPG delivery line and the diesel delivery line downstream from their respective coolers 60 and 62. The temperature sensors 72, 74 are installed in a way that the sensing tips of the sensor extend into the outlet of the fuel coolers.

The fuel-mixing system 14 also includes fuel filters 64 and 66 towards back ends of the LPG delivery line 46 and the diesel delivery line 48.

Two valves in the form of controllable normally closed solenoid valves 68 and 70 are provided towards either end of the LPG delivery line 46.

The dual fuel supply system 11 is configured selectively to change over between the diesel supply system 80 and the second stage 16 of the mixed fuel supply system 17 selectively to supply either diesel only or fuel mixture to the injection system 12.

The diesel supply system 80 is operatively able to supply diesel to the indirect-injection system 12 at a supply pressure within the fuel demand pressure range of the indirect-injection system 12 and at a supply temperature range that corresponds with the supply temterature range of the mixed fuel supply system 16.

The diesel supply system 80 includes a diesel supply circulation line or loop 82 (see arrow 84) that is connected in flow communication inline with the indirect-injection system 12.

The diesel supply system 80 includes a fuel cooler 85 in form of a refrigeration cooler inline the diesel supply circulation line upstream from the indirect injection-system 12

A diesel circulation pump 86 is provided inline the diesel circulation supply loop 82 upstream from cooler 85. The diesel circulation pump 86 can be the existing onboard diesel fuel feed pump of the vehicle.

The diesel supply system 80 includes a diesel bypass line 87 selectively to isolate the injection system 12 from the diesel circulation supply loop.

The supply temperature of the diesel is substantially in the same range as the temperature of the fuel mixture when supplied to the injection system 12 to retain the fuel fluidic path of the injection system and the engine at a sufficient temperature that resists boiling of the liquid fuel mixture when the fuel supply is changed over from the diesel supply system 80 to the mixed fuel supply system 17.

The dual fuel supply system 11 also includes a controller (not shown) that is interfaced with the relevant system components, pumps, valves, coolers, and the like, of the dual fuel supply system 11 to control the flow, temperature and pressure of the fuels through the system. The controller is typically a dedicated logic controller or programmable logic controller.

In use, when the diesel engine is in operation, the injection system 12 is supplied with either diesel or liquid fuel mixture of diesel and LPG.

When the fuel mixture is supplied to the injection-system 12 then fuel mixture circulates through the mixed fuel circulation supply loop 18 along flow path 20. The cooler 28 reduces the temperature of the circulating fuel mixture to maintain the liquid fuel mixture in a liquefied state at the fuel supply pressure of the injection system 12. The temperature sensor 30 measures the temperature of the circulating fuel mixture that exits the cooler 28. At the same time the pressure sensor 38 measures the pressure of the circulating fuel mixture.

If the pressure of the circulating fuel mixture is within its required pressure range but its temperature increases beyond a maximum threshold temperature then the temperature regulating system decreases the temperature of the fuel mixture by increasing the circulation rate of the fuel mixture with the circulating pump 26 through the cooler 28. Another way to control the temperature would be to circulate the fuel mixture at a constant rate, and to merely switch the fuel cooler on and off, as needed, to cool the fuel mixture.

The injection-system 12 uses fuel from the circulating fuel mixture that circulates in the mixed fuel circulation supply loop 18, which causes the supply pressure of the fuel mixture in the mixed fuel circulation loop 18 to drop over time. When the pressure of the circulating fuel mixture is reduced below a minimum threshold then the fuel-mixing system 14 is activated to supplement the mixed fuel circulating supply loop with fuel mixture from the fuel-mixing system 14.

When the fuel-mixing system 14 is activated, the two solenoid valves 68 are opened. Solenoid valve 68 is a safety cutout valve which is required in some countries like Australia. Solenoid valve 68 is not controlled by the dual fuel supply system controller, it is controlled independently by a separate safety device. This device detects impulses coming from the crankshaft sensor of the engine. Only if the safety device detects such impulses, which indicates that the engine is running, it opens valve 68 and 70 in the LPG delivery line and starts the two variable speed controlled pumps 50 and 52, and measures the flow rate of the diesel and LPG along their respective delivery lines 48 and 46 with the diesel flow meter 56 and the LPG flow meter 58 that is pumped from the diesel tank and the LPG tank to the mixer 40. The controller controls the diesel pump 52 and LPG pump 50 to supply the required ratio of diesel to LPG to mixer 40. The controller also activates the dies& fuel cooler 62 and the LPG cooler 60 to regulate the temperature of the diesel and LPG that is pumped to the mixer 40. Ideally both fuels should be regulated at the same temperature for the whole temperature range. Diesel cannot be cooled down below 0° C. as 0° C. is the cloud point of diesel. At temperatures below 0° C. wax particles are formed in the diesel that potentially can clog the diesel fuel cooler. For that reason the LPG has to be a bit cooler than the diesel for temperatures below 0° C. so that the resultant temperature of the fuel mixture is in the right range.

With pumps 52 and 50, the fuel-mixing system 14 delivers the diesel and LPG at a pressure that is sufficient to enter the mixed fuel circulation supply loop 18 and to charge the bladder accumulator 36 which increases the pressure of the circulating fuel mixture in the mixed fuel circulation supply loop 18. The pressure sensor 38 measures the pressure in the mixed fuel circulating supply loop 18, and when the pressure of the circulating fuel mixture reaches a maximum threshold then pumps 52 and 50 are switched off and valve 70 are closed.

The LPG pump 50 is switched off before the diesel pump 52 so that diesel is pumped into the mixed fuel supply line 22 before the fuel-mixing system 14 shuts down. This reduces the amount of LPG that is resident in the mixed fuel supply line 22 within which there is not active cooling when the fuel-mixing system is not active. In other words, the second stage 16 of the mixed fuel supply system 17 is at least partly flushed with diesel after each time the that fuel mixture was supplied to the second stage 16 of the mixed fuel supply system. Also, the mixed fuel supply system 17 is at least partly flushed with diesel before the diesel engine is switched off.

Meanwhile, diesel is circulating through the diesel bypass line 87, in particular in the case which the on-board diesel feed pump 86 is mechanically driven and can not be turned off.

When the dual fuel supply system 11 changes over from the mixed fuel supply system 17 to the diesel supply system 80, then the controller opens valve 91 in the diesel circulating supply line 82 and closes valve 89 in the diesel bypass line 87, to start circulating diesel through the diesel supply circulation line 82.

Subsequently, valve 35 in the mixed fuel circulation supply loop 18 is closed and valve 34 in the mixed fuel bypass line 32 is opened so that the fuel mixture bypasses the injection system 12.

Thus, while the diesel supply system 80 is supplying diesel to the injection system 12, fuel mixture is still being circulated in the mixed fuel bypass loop 33 through the cooler 28 to keep the resident fuel mixture in the mixed fuel circulation supply loop 18 at a sufficiently low temperature that prevents boiling of the liquid fuel mixture.

The dual fuel supply system 11 also includes a safety overflow line 94 that extends between an input end of the injection system 12 and the diesel tank 42. The safety over flow line 94 includes a pressure release valve 96 that has a crack pressure in a range of 3 bar and 16 bar depending on the maximum demand pressure of the injection systems. When pressure in the injection system 12 raises beyond the crack pressure of the pressure release valve 96, for example if the temperature of the mixed fuel is to high so that the vapor pressure of the liquid fuel mixture rises beyond the crack pressure of pressure release valve 96, then the pressure release valve opens and the fuel flows along the safety overflow line 94. The safety overflow line 94 includes an absorber and liquid/gas separator 98 that passes diesel to the diesel tank 42 and that absorbs gaseous LPG.

The controller is also configured automatically to change over from the mixed fuel supply system 17 to the diesel supply system 80 when the pressure in the mixed fuel supply circulation loop 18 drops below a set pressure threshold.

Also, the temperature of the fuel, fuel mixture and/or diesel, is regulated at a sufficient low temperature that compensates for the additional temperature that is introduced into the fuel when it circulates through the fuel fluidic path of the diesel engine and injections system. Similarly, the temperature of the liquefied gaseous fuel and the diesel fuel prior to mixing is regulated at temperatures that are sufficiently lower than the vapor temperature of the liquefied gaseous fuel at the mixing pressure, to compensate for heat that is added to the fuel mixture during mixing and when flowing to the mixed fuel supply circulation line.

There are also safety measures built into the system, such as that the controller is configured to monitor the temperature of the liquid fuel mixture in the mixed fuel supply circulation line 18, and to switch over to the diesel supply system if the temperature rises above a set temperature threshold.

Further, the controller is configured to monitor the temperature in the mixed fuel bypass loop 32, and if the temperature of the liquid fuel mixture in the mixed fuel bypass loop is above a set temperature threshold then to resist switching over from the diesel supply system 80 to the mixed fuel supply system 17.

In addition, the controller is configured to monitor the supply temperature of the diesel, and if the supply temperature of the diesel is above a set temperature threshold then to resists change over to the mixed fuel supply system.

The controller is configured to trigger an alarm if the flow rate of diesel in the diesel supply circulation line or the flow rate of fuel mixture in the mixed fuel circulation line is below a set flow rate threshold.

As part of controlling the temperature, the ratio of diesel to liquefied gaseous fuel can be altered to offset the vapor temperature of the fuel mixture at the supply pressure.

Figure 3:
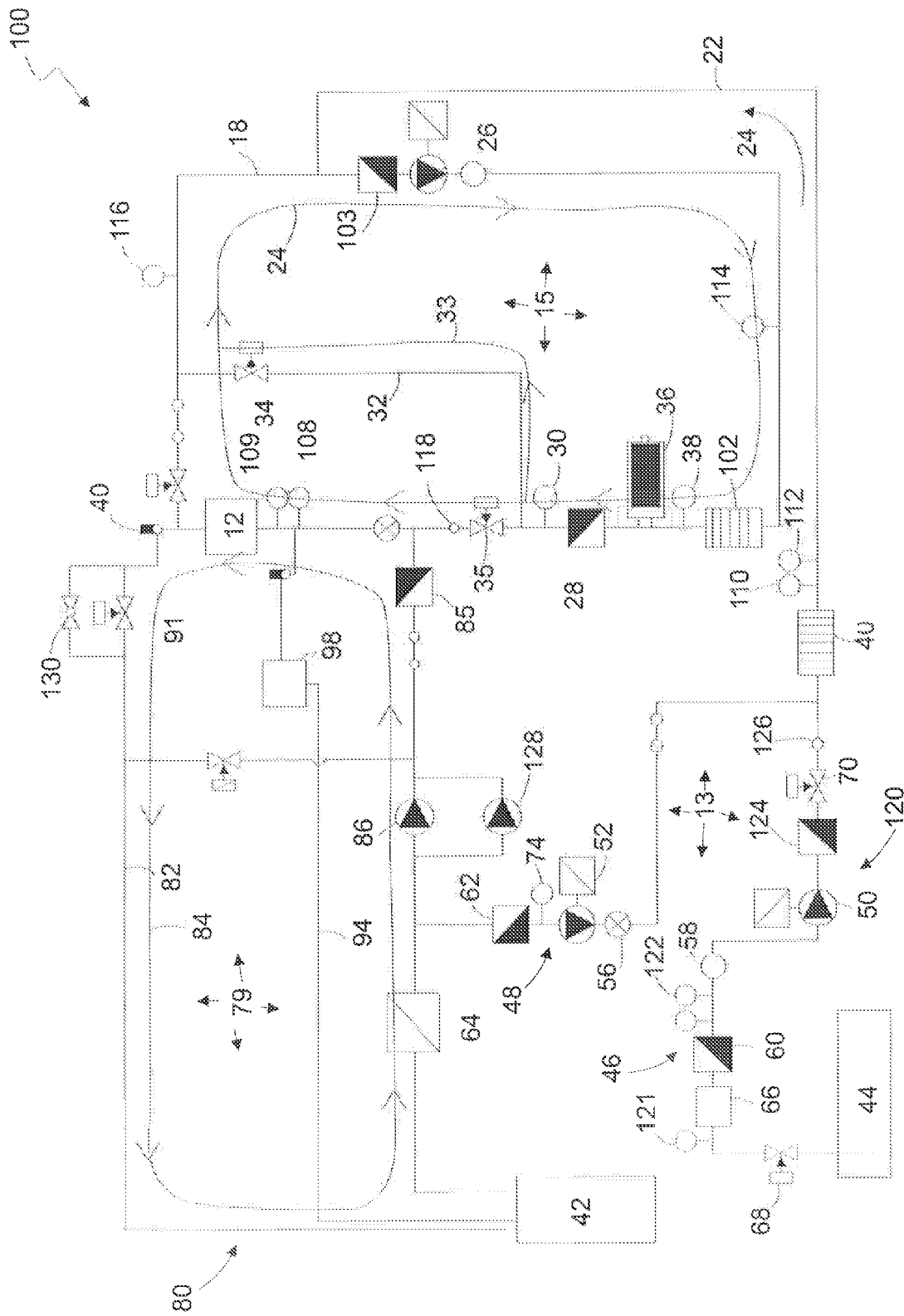
FIG. 3 is a schematic representation of a second embodiment of the dual fuel system the includes the first embodiment and additional system components.

FIG. 3 shows a dual fuel supply system 100 that is essentially identical to the dual fuel system 11 in FIG. 2, but includes additional system components. In FIG. 3 like parts in FIG. 2 are indicated with like reference numerals unless specifically indicated by an unlike reference numeral. The additional system components include in mixed fuel circulation supply loop 18 a mixer 102, an additional cooler 103, additional temperature sensors 110, 114, 108, 116, and additional pressure sensors 109, 112, and an additional non-return valve 118 upstream from the cooler 28.

The fuel-mixing system 120 of the dual fuel supply system 100 also includes additional parts, such as additional pressure sensors 121 and 122, an additional cooler 124 in the LPG delivery line, and a non-return valve 126.

The diesel supply system 131 of dual fuel supply system 100 includes an additional auxiliary diesel pump 128 and a manual valve 130. It will be appreciated that the general working and control of the dual fuel supply system 100 is essentially identical to that of the dual fuel supply system 11 as described above.

Figure 4:
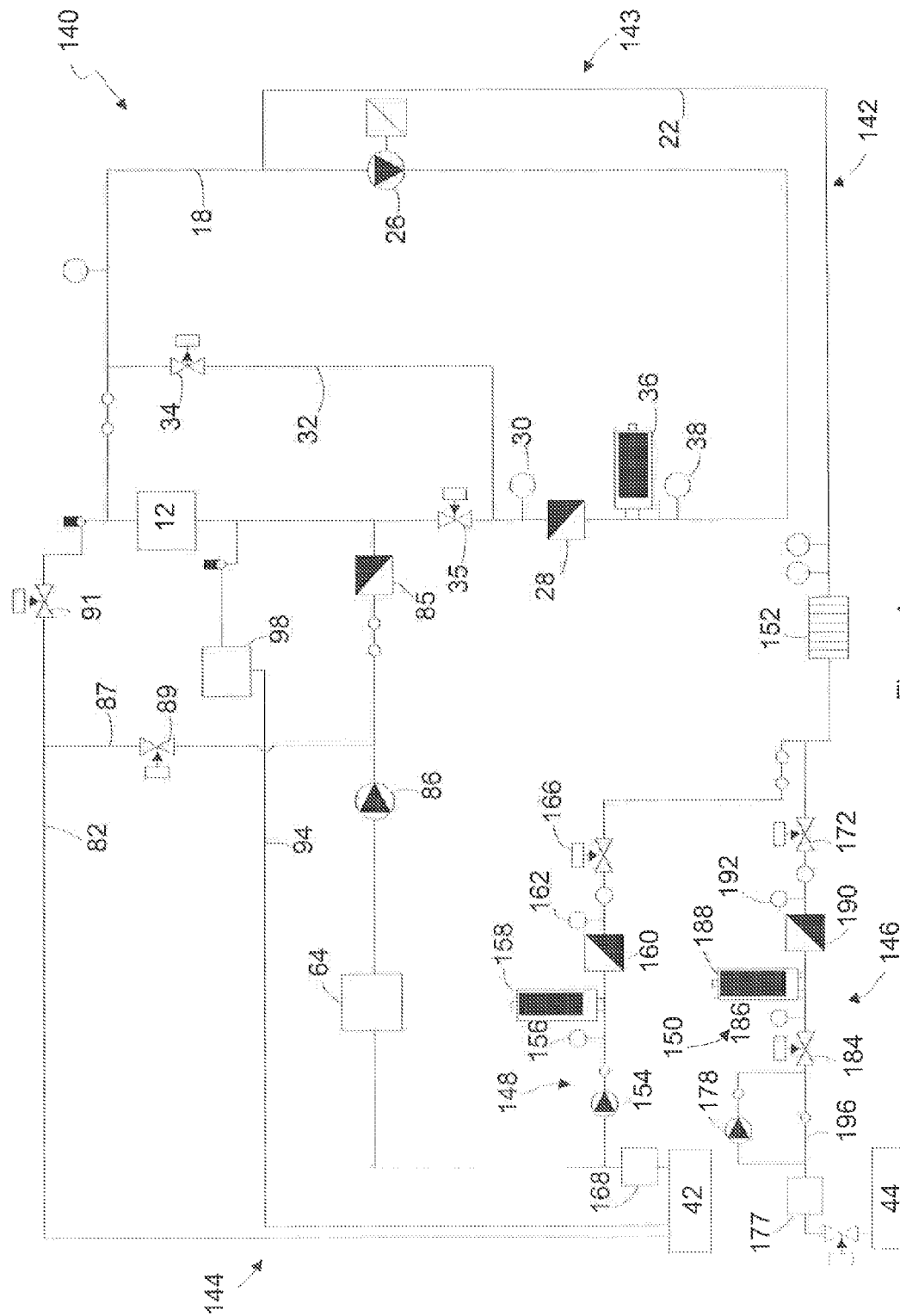
FIG. 4 is a schematic representation of a third embodiment of the dual fuel system.

FIG. 4 shows another embodiment of a dual fuel supply system 140 that in accordance with the invention. The dual fuel supply system 140 includes a mixed fuel supply system 143 and a diesel supply system 144. The diesel supply system 144 is substantially identical to the diesel supply system 80 in FIG. 2.

The second stage 142 of the mixed fuel supply system 143 is substantially identical to the second stage 16 of the mixed fuel supply system 11 in FIG. 2.

However, the dual fuel supply system 140 includes a fuel-mixing system 146 that is different from the fuel-mixing system 14 in FIG. 2.

The fuel-mixing system 146 also includes a diesel delivery line 148 and a LPG delivery line 150 to supply diesel and LPG to a mixer 152.

The diesel delivery line 148 includes a diesel feed or booster pump 154, a diesel bladder accumulator 158 downstream from the diesel booster pump 154, and a cooler 160 downstream from the diesel bladder accumulator 158. The diesel delivery line further includes a proportioning valve 166 upstream from the cooler 160. A pressure sensor 156 and a temperature sensor 162 are provided inline the diesel delivery line 148. A filter 168 is provided towards a back end of the diesel delivery line 148.

Similarly, the LPG delivery line 150 includes a LPG feed or booster pump 178, a LPG bladder accumulator 188 downstream from the LPG booster pump 178, and a cooler 190 downstream from the LPG bladder accumulator 188. The LPG delivery line further includes a proportioning valve 172 downstream from the cooler 190. A pressure sensor 186 and a temperature sensor 192 are provided inline the LPG delivery line 150. A filter 179 is provided towards a back end of the LPG delivery line 148.

The LPG inside the LPG tank 44 is ordinarily stored in a pressurized state, and therefore if the pressure in the LPG tank 44 is adequate to charge the LPG bladder accumulator 188 then the LPG booster pump 180 is not used at such time. The flow of LPG from the LPG tank 44 directly to LPG bladder accumulator 188 along line section 196 is controlled by opening and closing of valve 184. Otherwise, the LPG booster pump 178 is activated to increase the supply pressure of the LPG to the LPG bladder accumulator 188.

Valve 172 is used as an isolation valve similar to that shown in FIG. 2.

In use, when the pressure of the fuel mixture in the mixed fuel supply circulation line 18 falls below a supply pressure threshold, then the fuel-mixing system 146 is activated by the controller to supplement the mixed fuel circulation supply loop 18 with fuel mixture by charging the mixed fuel bladder accumulator 36 inline the mixed fuel circulation supply loop 18.

If the pressure in the diesel bladder accumulator 158 or in the LPG bladder accumulator 188 falls below a pressure threshold as detected by the pressure sensors 156 and 186, then the booster pumps 156 and 178 is activated by the controller to charge the bladder accumulators 158 and 188 respectively with diesel and LPG. It will be appreciated that with the configuration of the fuel-mixing system 146, the charging of bladder accumulators 158 and 188 can be independently controlled, that is the bladder accumulators can be charged prior to releasing diesel and LPG to the mixer 152.

The coolers 160 and 190 reduces the temperature of the diesel and LPG to regulate the temperature of both the diesel and LPG at a temperature at which the LPG is in a liquefied state at the pressure inline the delivery lines. The diesel and LPG is then mixed in the mixer 152 and passed to the mixed fuel circulation supply loop 18. The additional working and controlling of the dual fuel supply system 140 is essentially identical to that described above with reference to the dual fuel supply system 11 in FIG. 2.

Figure 5:
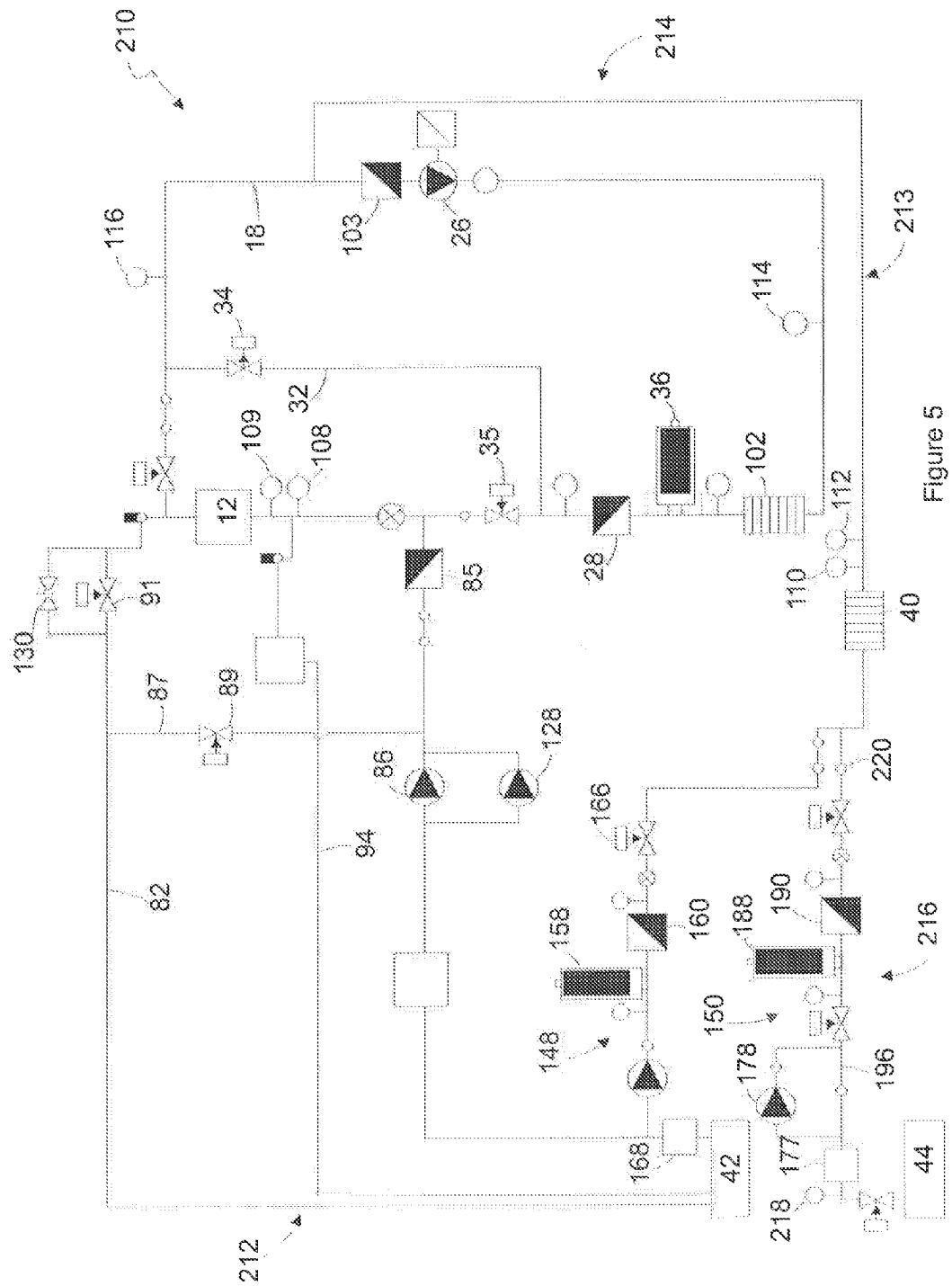
FIG. 5 is a schematic representation of a fourth embodiment of the dual fuel system that includes the third embodiment and additional system components.

FIG. 5 shows another embodiment of a dual fuel supply system 210 that is essentially identical to the dual fuel system 140 in FIG. 5, but that includes a number of additional system components in the diesel supply system 212 and the second stage 213 of mixed fuel supply system 214, not unlike the embodiment described with reference to FIG. 3.

The fuel-mixing system 216 is similar to the fuel-mixing system 146 in FIG. 4, but also includes a few additional components such as the pressure sensor 218 and the non-return valve 220 in the LPG delivery line.

Figure 6:
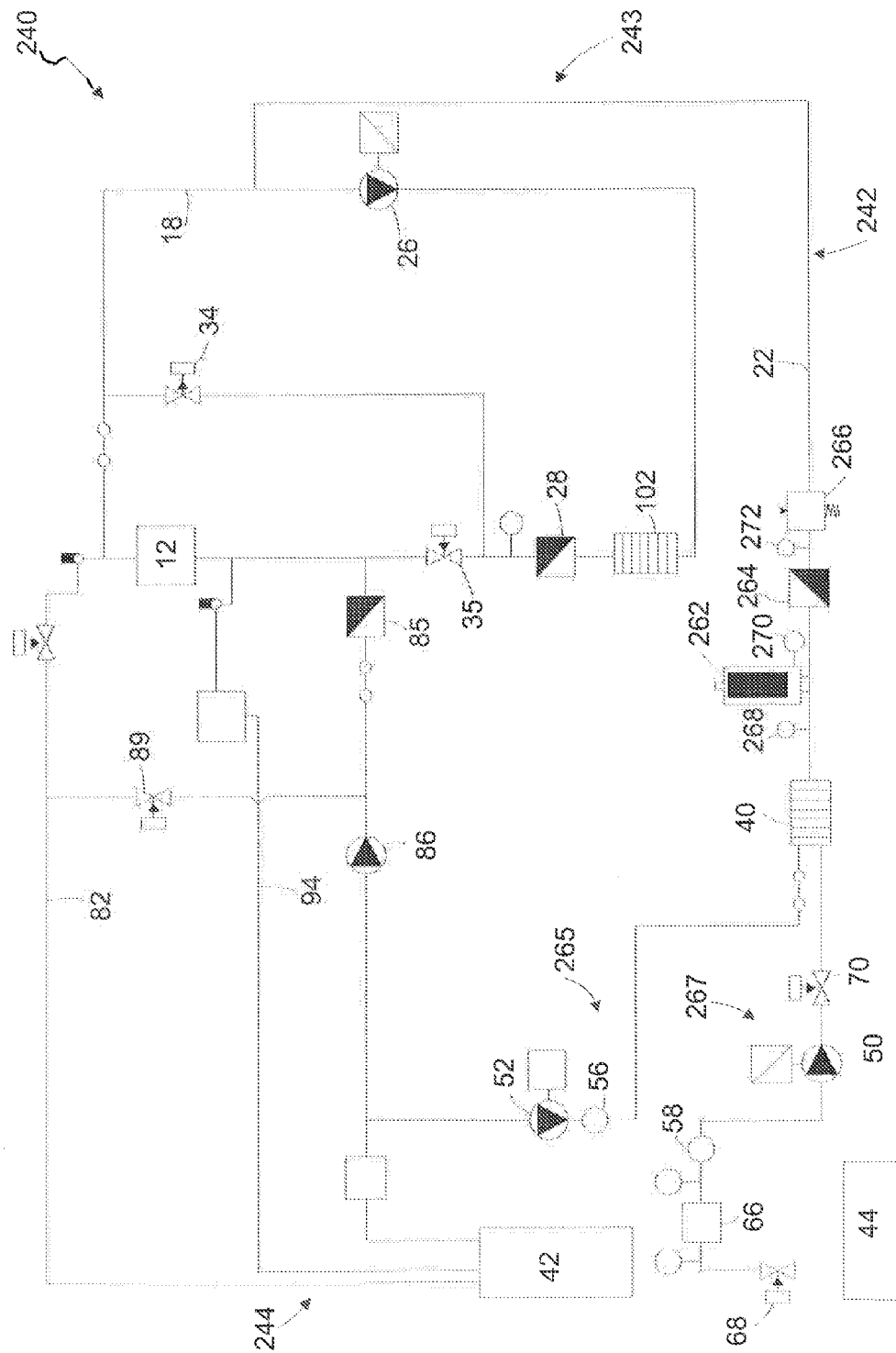
FIG. 6 is a schematic representation of a fifth embodiment of the dual fuel system.

FIG. 6 shows another embodiment of a dual fuel supply system 240, in accordance with the invention.

The dual fuel system 240 includes a mixed fuel supply system 243 and a diesel supply system 244

The second stage 242 of the mixed fuel supply system 243 is substantially similar to the embodiments described with reference to FIGS. 2 to 5, in that it also includes a mixed fuel circulation supply loop 18, a mixed fuel bypass loop 32, a cooler 28 and a mixed fuel circulation pump 26 and solenoid valves 34 and 35. However, the mixed fuel bladder accumulator 262 is positioned inline the mixed fuel supply line 22 towards a back end of the mixed fuel supply line 22, as opposed to being inline the mixed fuel circulation supply loop 18.

Another difference to the embodiments in FIGS. 2 to 5, is that a cooler 264 is provided inline the mixed fuel supply line 22 upstream from the mixed fuel bladder accumulator 262. Also, a pressure regulating valve 266 is positioned upstream from the cooler 264 inline the mixed fuel supply line 22.

The mixed fuel supply system 242 further includes an associated pressure sensor 268 and temperature sensors 270 and 272 for use in controlling the pressure and temperature of the fuel mixture that is supplied to the mixed fuel circulation supply loop 18.

The fuel-mixing system 256 is substantially similar to the fuel-mixing system as described with reference to FIGS. 2 and 3, but excludes coolers from the diesel delivery line 265 and the LPG delivery line 267. The pressure regulating valve 266 ensures that the pressure of the fuel mixture in the mixed fuel supply circulation loop 18 is within the required pressure demand range of the injection system 12, thus, the pressure towards the backend of the pressure regulating valve 266 is maintained at a pressure that is sufficiently high to maintain the LPG in a liquefied state, and therefore does not require the coolers in the diesel and LPG delivery lines. It will be appreciated that the addition of coolers in the diesel and LPG lines is nevertheless an optional feature.

The diesel fuel system 244 is substantially identical to the diesel fuel system 80 as described with reference to FIG. 2.

Figure 7:
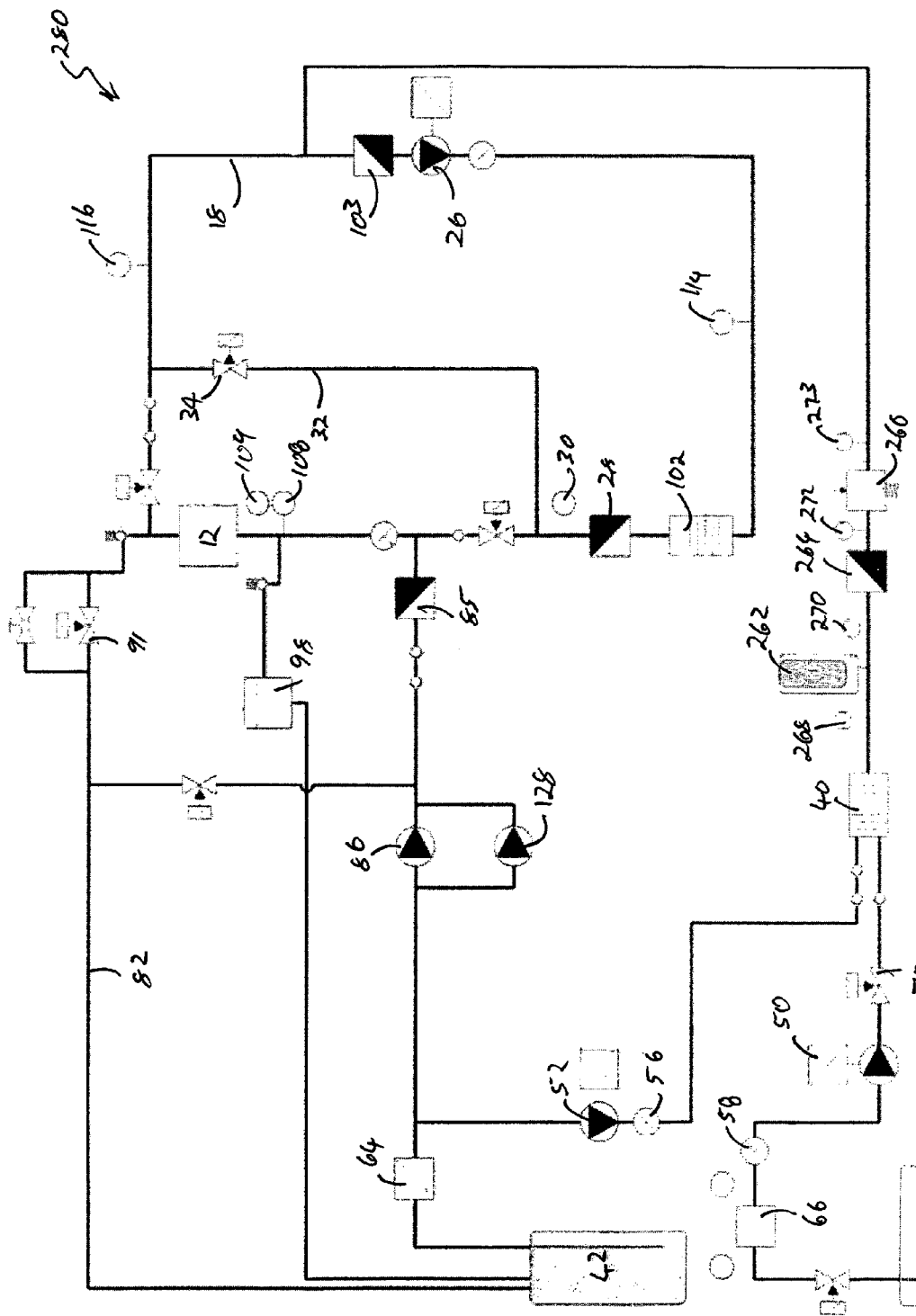
FIG. 7 is a schematic representation of a sixth embodiment of the dual fuel system that includes the fifth embodiment and addition system components.

FIG. 7 shows another embodiment of a dual fuel supply system 280 that is substantially similar to the dual fuel supply system 240 in FIG. 6, but includes a few additional system components not unlike as described with reference to the dual fuel supply system 100 in FIG. 3.

Figure 8:
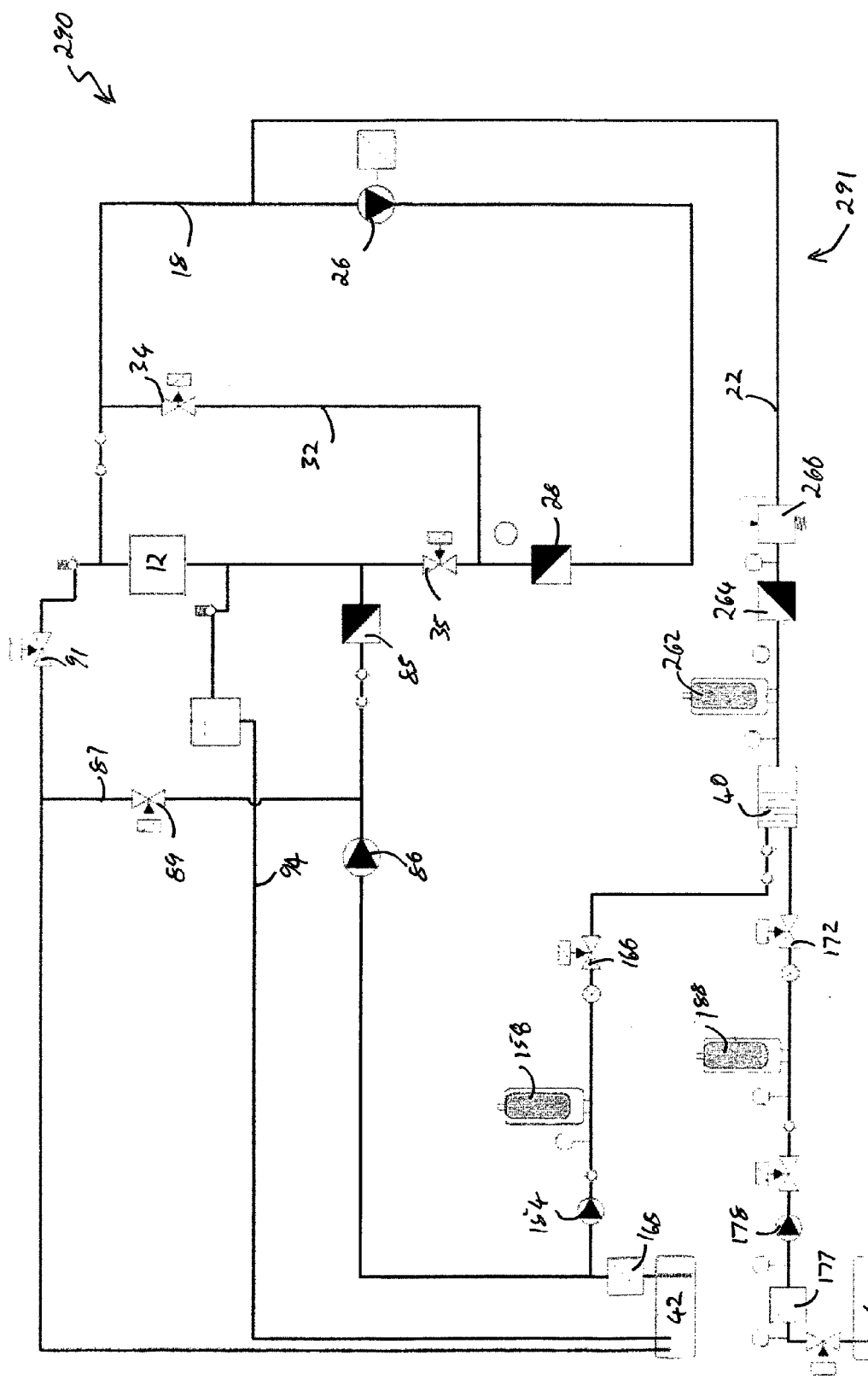
FIG. 8 is a schematic representation of a seventh embodiment of the dual fuel system.

FIG. 8 shows another embodiment of a dual fuel supply system 290 in accordance with the invention. The dual fuel supply system 290 includes a second stage of a mixed fuel supply system 291 that is substantially similar to the second stage of the mixed fuel supply system 242 described with reverence to FIG. 6.

The dual fuel system 290 further includes a fuel-mixing system 292 that is substantially similar to the fuel-mixing system as described with reference to FIG. 4, however, the fuel-mixing system excludes coolers from its diesel and LPG delivery lines. Omission of the coolers is possible for the same reasons as described above with reference to the fuel-mixing system 246 in FIG. 6.

Figure 9:
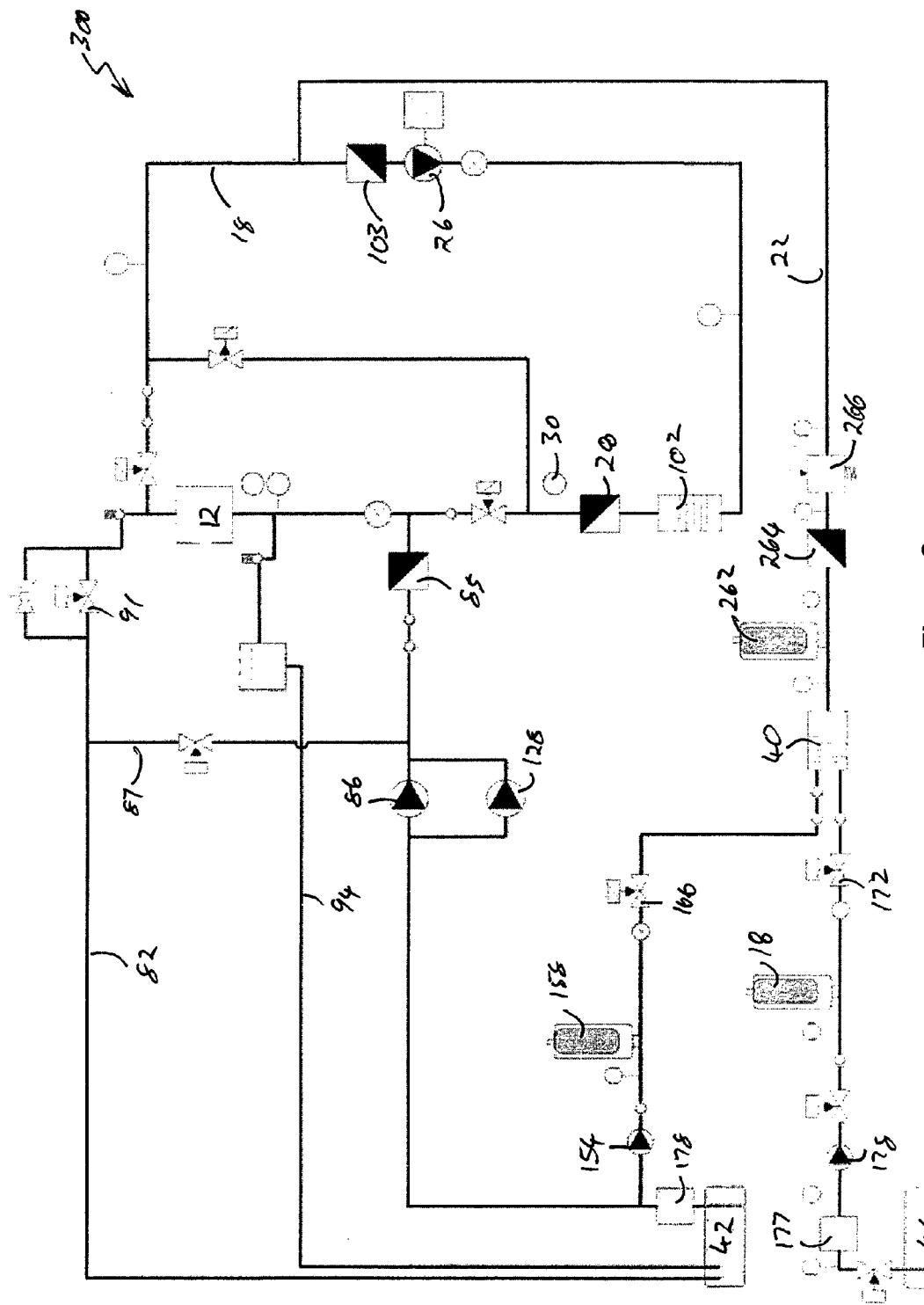
FIG. 9 is a schematic representation of an eighth embodiment of the dual fuel system that includes the seventh embodiment and additional system components.

FIG. 9 shows another embodiment of a dual fuel supply system 300 that is substantially similar to the dual fuel supply system in FIG. 7, but includes a few additional components not unlike as the dual fuel supply system 210 as described with reference to FIG. 5.

Figure 10:
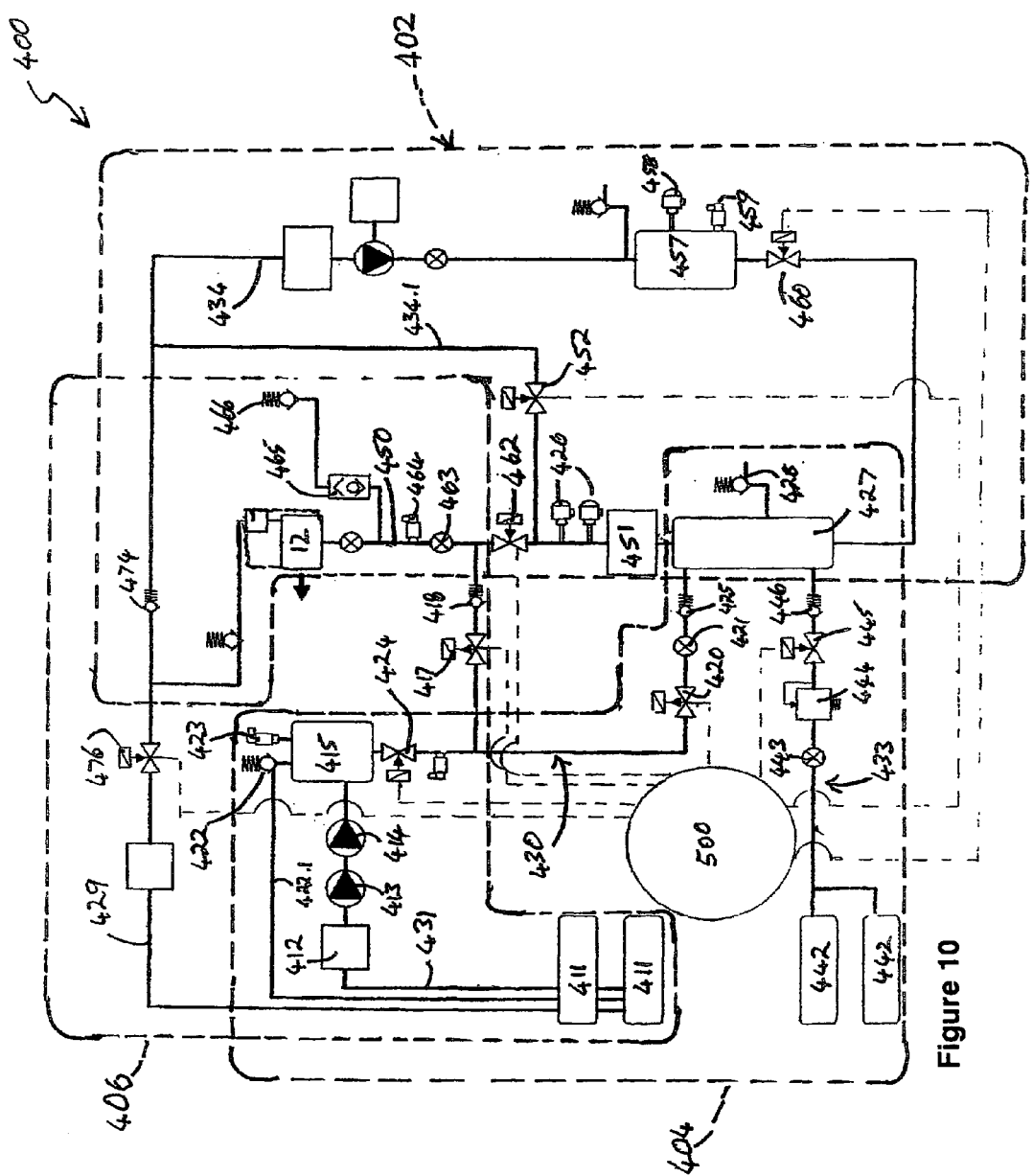
FIG. 10 is a schematic representation of a ninth embodiment of the dual fuel system.

FIG. 10 shows a further embodiment of a dual fuel supply system 400, in accordance with the invention, for a low pressure or indirect-injection diesel engine for trucks and prime movers.

The dual fuel supply system 400 includes a mixed fuel supply system 402, a fuel-mixing system 404, and diesel supply system 406.

The mixed fuel supply system 402 includes a mixed fuel supply circulation line 434. The mix-fuel circulation line 434 includes a mixer 427 that defines a mixing chamber and has a pressure release valve 428 to release excess pressure. In this embodiment, the mixer 427 is installed inline the mixed fuel circulation supply line 434, and thus forms a common component between the fuel-mixing system 404 and the mixed fuel supply system 402.

In use, fuel mixture passes from the mixer 427 along rail fuel line 450 of the injection system 12. The temperature of the fuel mixture is regulated to approximately 3° C. while maintaining a pressure of about 120 psi. There are two temperature sensors 426 downstream of the cooler 451.

The mixed fuel circulation supply line 434 includes another cooler, a variable speed controlled circulation pump, a flow meter, a pressure release valve, and a mixed fuel pressure fuel tank 457 downstream respectively.

The mixed fuel pressure fuel tank 457 has a temperature sensor 458 and a pressure sensor 459. Between the mixed fuel pressure fuel tank 457 and the mixer 427 there is a solenoid valve 460 which can control the flow of mixed fuel to the mixer 427.

A mixed fuel bypass line 434.1 divides off the rail fuel line 450 and forms an alternate pathway bypassing the injection system 12. Valves 452 and 462 are controlled to divert fuel mixture through either the mixed fuel circulation supply line 434 or the bypass line 434.1.

Downstream of the solenoid valve 462, the rail fuel line 450 in downstream order includes a flow meter 463, pressure sensor 464, a pressure release valve arrangement 465 and 466.

Diesel is introduced from a service station pump at atmospheric pressure into onboard diesel tanks 411. Diesel is drawn and pumped from diesel tanks 411 along pipe 431 via an inline filter 412 by diesel fuel pump 413 and diesel booster (auxiliary) pump 414, which together is able to increase the pressure of the diesel flowing from the diesel pumps to a pressure of about 150 psi.

The inline filter 412 is a glass-housing type filter.

The diesel fuel is subsequently stored under pressure in a pressurized diesel tank 415. A pressure sensor 423 is provided for measuring the pressure inside the pressurized diesel tank 415. A diesel return line 422.1 extend between the pressurized diesel tank 415 and the diesel tank 414 and includes an inline pressure release valve to allow diesel to return to the diesel tanks 411 if the pressure inside the tank 415 increases beyond a crack pressure of the pressure release valve 422.

From the pressurized diesel fuel tank 415, diesel passes through a controllable solenoid valve 424 and a pressure sensor 19 before being diverted into one of two possible pathways. These components, 411 to 415 including solenoid valve 424 and pressure sensor 149, are common components for the diesel supply system 406 and the fuel-mixing system 404.

The fuel-mixing system 404 includes a diesel delivery line 430 having a diesel proportioning valve 420, a flow meter 421 and a non-return valve 425 before entering the mixing chamber 427.

LPG is introduced into the LPG tanks 442 from a service station pump where the tank 442 is filled under the pressure of approximately 150 psi in liquid state. LPG is stored under pressure at approximately 150 psi in liquid state. The fuel-mixing system 404 includes a LPG delivery line 433 having a flow meter 443, LPG pressure regulating valve 444, a LPG proportioning valve 445 and non-return valve 446. Pressurized liquid LPG enters the mixing chamber 427 at approximately 120 psi.

The mixer can be an alternate form of mixer such as a venture-mixer where a major flow of LPG draws in and causes a minor flow of diesel to mix with the LPG.

A preferred ratio of fuels is 30% diesel and 70% LPG. However, there is a range of ratios from 10% diesel and 90% LPG to 90% diesel and 10% LPG. Ratios of fuel blends which use less than 30% diesel can be achieved where the lubricity of the fuel mix is increased. In particular, low sulphur diesel which undergoes additional filtration treatment has reduced lubricity and fuel blends below a diesel percentage of 30% requires additional lubricity in order to maintain engine components.

The diesel supply system 406 includes a diesel circulation loop 429. Diesel passes a diesel fuel valve 417 and a non-return valve 418 before joining the rail fuel line 450 which connects to the injection system 12.

When diesel is used as the sole fuel source, the electronic control unit closes valves 420, 462, 445 and opens valves 424, 417, 476. When diesel is returned, valve 476 is open while one way pressure valve 474 is shut.

When a mixed fuel is used the electronic control unit 500 closes valves 417, 476, 452 and opens valves 420, 424, 445, 462 and 460.

The electronic control unit 500 controls the opening and closing of the valves in response to the demand for fuel as indicated by various engine sensors. The electronic control unit 500 processes information regarding revolutions per minute of the engine from a crank angle sensor.

Emission Test Results

Emission tests were conducted for the dual fuel system 400 as described above with reference to FIG. 10 by independent third parties Brisbane City Council and Diesel test Australia the results were analyzed by Gilmore Engineers Pty Ltd for the dual fuel system 500. Two tests were conducted when the vehicle used diesel only and LPG/diesel (at a ratio of 70% LPG and 30% diesel). The diesel only test (test 1081) was conducted on $19^{th}$ September 187 using the DT80 short test. The LPG/diesel test (test 4179) was conducted on $14^{th}$ January 188 using the DT80 short test. The same vehicle was used for both tests. The vehicle was a Daimler Chrysler Freightliner Colombia with Registration Number VV68HD truck with a vehicle test mass of 45000 kg. The DT80 short test was a series of rapid accelerations and decelerations interspersed with idling and are designed to evaluate vehicle emissions during typical "real world" stop start operating modes and conditions. In addition to these test DT 80 tests the Brisbane City Council were commissioned to compare a similar truck with similar mileage to VV68HD running on diesel. A clean running Volvo FH12 prime mover was selected. The Daimler Chrysler Freightliner Colombia VV68HD truck was a prime mover using a low pressure diesel engine whereas the Volvo FH12 prime mover used a high pressure diesel engine. The results of test 4418 are tabulated below.

On the 31 Jul. 2008 a further DT 80 Test was conducted by the Brisbane City Council using a 183 model freightliner C112 Century (which is basically the same model as VV68HD with the exception of a sleeper cab). These results are also tabulated below. The emission test results are summarized below:

| | UNITS | DIESEL ONLY VV68HD Test 1081 | DIESEL ONLY 979GYQ) Freightliner Test 4819 | DIESEL ONLY 920KLZ Volvo Test 4418 | LPG/DIESEL VV68HD) Test 4179 | DNEPM Limits |
|---|---|---|---|---|---|---|
| $NO_x$ (Nitrous Oxide) | g/kWh | 20.61 | 22.36 | 18.41 | 9.942 | |
| | g/km · t | 0.692 | 0.838 | 0.497 | 0.368 | 1.2 |
| PM LLSP (Particulate Matter) | mg/kWh | 9.002 | 8.87 | 6.114 | 3.723 | |
| | mg/km · t | 1.950 | 2.966 | 9.754 | 0.962 | 50 |
| Average Opacity | AV % | 1.111 | 3.368 | 6.487 | 0.831 | 25 |
| Opacity Smoke | Max % | 12.39 | 49.88 | 42.35 | 4.38 | |

Based on these results, an engine under the DT80 short test driving cycle using the LPG/diesel fuel mixture has significantly lower opacity, significantly lower particulate emissions, and lower $NO_x$ emissions on a per km basis in comparison with diesel.

The $NO_x$ emissions using the LPG/diesel mixture are only 30.66% of that allowable by the DNEPM (Diesel Vehicle Emission National Environment Protection Measure) limits. Particulate matter emissions are only 3.25% of that allowable by DNEPM limits and average opacity is 3.35% of that allowable by DNEPM limits. In summary, the emission levels using LPG/diesel mixture are substantially lower than that allowable by DNEPM limits.

ADVANTAGES

The preferred embodiments of the dual fuel supply system for indirect-injection fuel systems has the advantage provides fuel redundancy in that the dual fuel supply system is able to supply either a fuel mixture or diesel only to the indirect-injection system, and is selectively changed over between the two systems.

Another advantage of the dual fuel supply system is that the when the dual fuel supply system supplies diesel only to the indirect-injection system, the diesel temperature is controlled to retain the fuel flow path of the engine at a temperature is safe for the dual fuel supply system to switch over to the mixed fuel supply system without causing boiling of the liquid fuel mixture.

A further advantage of the dual fuel supply system is that it is able to regulate the supply temperature of the diesel or the fuel mixture at a temperature that is sufficiently lower than the vapor temperature of the fuel mixture, so as to compensate for the introduction of heat into the fuel mixture by the engine, in use, so as to retain the fuel mixture below its vapor temperature at the fuel demand pressure.

Advantageously, the mixed fuel supply system is designed to minimize the volume of the fuel mixture flow path, so as minimize the amount for fuel mixture that is resident in the mixed fuel supply system when the dual fuel supply system supplies diesel only to the indirect-injection system.

Also, the dual fuel supply system is configured at least partly to flush the fuel mixture flow path with diesel after the fuel mixture is supplied to the second stage of the mixed fuel supply system and before the diesel engine is stopped.

The dual fuel supply system also has the advantage that the diesel supply system, the first stage of the mixed fuel supply system, and the second stage of the mixed fuel supply system are independently controllable. In particular, the second stage of the mixed fuel supply system includes a pressure accumulator to buffer pressurized fuel mixture, and therefore separates continuous pressure control dependency from the first stage of the mixed fuel supply system and contributes to control stability during fuel demand fluctuation of the diesel engine.

Also, the dual fuel system employs multiple fuel coolers respectively within the sub-systems of the dual fuel supply system, which increase the temperature controllability of the fuels through the dual fuel supply system.

The dual fuel supply system is also designed to use a substantial part of the existing fuel system components, and therefore reduced the modifications needed to equip a diesel engine with the dual fuel supply system.

VARIATIONS

It will of course be realized that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A dual fuel supply system for supplying fuel to an indirect-injection system of a diesel engine, the dual fuel supply system including:
a diesel supply system configured to supply diesel to the indirect-injection system;
a mixed fuel supply system configured to supply a liquid fuel mixture of diesel and liquefied gaseous fuel to the indirect-injection system at a supply pressure within a fuel demand pressure range of the indirect-injection system and includes a fuel cooler in a mixed fuel supply line to cool and retain the liquid fuel mixture in a liquefied state;
and a controller configured to selectively control a changeover between the diesel supply system and the mixed fuel supply system; wherein the mixed fuel supply system is configured to regulate the supply pressure of the liquid fuel mixture within a pressure range in an upper half of the fuel demand pressure range of the indirect-injection system; the diesel supply system includes a fuel cooler in a diesel supply line to cool the supply of diesel to assist the liquid fuel mixture to retain a liquefied state within the indirect-injection system, and the dual fuel supply system is configured to permit selective change over between the diesel supply system and the mixed fuel system to supply the indirect-injection system selectively with either diesel or liquid fuel mixture respectively; and the diesel supply system and the mixed fuel supply system include a bypass line in their respective supply lines to bypass the indirect-injection system;
the controller is configured to flush the mixed fuel supply line with diesel before switching over from the mixed fuel supply system to the diesel supply system; the controller is configured to flush the mixed fuel supply line with diesel after the mixed fuel supply system charged the second stage of the mixed fuel supply system with liquid fuel mixture; the controller is configured to flush the mixed fuel supply line before the diesel engine is stopped; the controller is configured to regulate the flow rate of the fuel mixture through the at least one fuel cooler in the mixed fuel supply line to regulate the temperature of the fuel mixture; the controller is configured to automatically changeover from the mixed fuel supply system to the diesel supply system when the pressure in the mixed fuel supply circulation loop drops below a set pressure threshold; the controller is configured to regulate the temperature of the liquefied gaseous fuel and the diesel fuel prior to mixing at temperatures that are lower than the vapor temperature of the liquefied gaseous fuel at the mixing pressure to compensate for heat that is added to the fuel mixture during mixing and when flowing to the mixed fuel supply line; the controller is configured to monitor the temperature of the liquid fuel mixture in the mixed fuel supply line and to switch over to the diesel supply system if the temperature rises above a set temperature threshold; the controller is configured to monitor the temperature in the mixed fuel bypass line, and if the temperature of the liquid fuel mixture in the mixed fuel bypass line is above a set temperature threshold then to prevent switching over from the diesel supply system to the mixed fuel supply system; the controller is configured to monitor the supply temperature of the diesel and if the supply temperature of the diesel is above a set temperature threshold then to prevent change over to the mixed fuel supply system.

2. A dual fuel supply system for supplying fuel to an indirect-injection system of a diesel engine, the dual fuel supply system comprising:
a diesel supply system configured to supply diesel to the indirect-injection system; and the diesel supply system has a fuel cooler in a diesel supply line configured to cool the supply of diesel prior to mixing with the liquefied gaseous fuel;

a mixed fuel supply system configured to supply a liquid fuel mixture of the diesel and the liquefied gaseous fuel to the indirect-injection system at a supply pressure within a fuel demand pressure range of the Indirect-injection system and at a temperature range that retains the liquid fuel mixture below its vapor temperature; and said mixed fuel supply system has a fuel cooler in a mixed fuel supply line configured to cool and retain the liquid fuel mixture in a liquefied state;

a controller configured to regulate the temperature of the liquefied gaseous fuel and the diesel fuel prior to mixing so that the temperature is sufficiently lower than the vapor temperature of the liquefied gaseous fuel at the mixing pressure to compensate for heat that is added to the fuel mixture during mixing and supplying to the mixed fuel supply line; said controller configured to selectively control a changeover between the diesel supply system and the mixed fuel supply system; wherein the mixed fuel supply system is configured to regulate the supply pressure of the liquid fuel mixture within a pressure range in an upper half of the fuel demand pressure range of the indirect-injection system; the dual fuel supply system is configured to permit the selective changeover between the diesel supply system and the mixed fuel system to supply the indirect-injection system selectively with either diesel or liquid fuel mixture respectively; and the diesel supply system and the mixed fuel supply system have a bypass line in their respective supply lines configured to bypass the indirect-injection system.

3. The dual fuel supply system as claimed in claim 2, wherein the controller is configured to monitor the temperature of the liquid fuel mixture in the mixed fuel supply system and switch over to the diesel supply system if the temperature rises above a set temperature threshold.

4. The dual fuel supply system as claimed in claim 2, wherein the controller is configured to monitor the temperature in the mixed fuel supply system and if the temperature of the liquid fuel mixture rises above a set temperature threshold then to prevent switching over from the diesel supply system to the mixed fuel supply system.

5. The fuel supply system as claimed in claim 2, wherein the controller is configured to monitor the supply temperature of the diesel and if the supply temperature of the diesel rises above a set temperature threshold then to prevent changeover to the mixed fuel supply system.

6. The dual fuel supply system as claimed in claim 2, wherein the controller is configured to trigger an alarm if the flow rate of diesel in the diesel supply system or the flow rate of the liquid fuel mixture in the mixed fuel supply system is below a set flow rate threshold.

7. The dual fuel supply system as claimed in claim 2, wherein the mixed fuel supply system includes a first stage and a second stage, the first stage includes an liquefied gaseous fuel tank, diesel tank and a fuel mixer configured to mix the separate fuels to form the liquid fuel mixture, the second stage of the mixed fuel supply system configured to regulate the liquid fuel mixture pressure and the liquid fuel mixture temperature and supply the liquid fuel mixture to a fuel rail of the indirect-injection system.

8. The dual fuel supply system as claimed in claim 7, wherein the mixed fuel supply system has a pressure accumulator, and the mixed fuel supply system is configured to charge the pressure accumulator with the liquid fuel mixture when the supply pressure in the second stage of the mixed fuel supply system drops into a lower half of the fuel demand pressure range of the indirect-injection system.

9. The dual fuel supply system as claimed in claim 8, wherein the mixed fuel supply system has a flow path volume to accommodate at least the amount of liquid fuel mixture that the diesel engine consumes at full load for one minute; and
the mixed fuel supply system comprises an inline circulation pump and is positioned upstream of the fuel cooler which in turn is downstream of the indirect injection system.

10. The dual fuel supply system as claimed in claim 9, wherein the fuel cooler comprises an evaporator through which a refrigerant is passed, and a shut-off valve to shut-off the flow of refrigerant thought the evaporator; the second stage of the mixed fuel supply system comprises a temperature sensor positioned before the indirect-injection system which is configured to measure the supply temperature of the liquid fuel mixture that is supplied to the indirect-injection system; the second stage of the mixed fuel supply system includes at least one pressure sensor positioned before the indirect-injection system which is configured to measure the supply pressure of the liquid fuel mixture being supplied to the indirect-injection system; and the second stage of the mixed fuel supply system Includes a flow sensor which is configured to measure a flow rate of the circulating liquid fuel mixture.

11. The dual fuel supply system as claimed in claim 8, wherein the mixed fuel pressure accumulator is a bladder accumulator and the second stage of the mixed fuel supply system includes an inline pressure regulating valve.

12. The dual fuel supply system as claimed in claim 9, wherein the second stage of the mixed fuel supply system includes a second inline fuel cooler.

13. The dual fuel supply system as claimed in claim 2, wherein the mixed fuel supply system is configured to regulate a ratio of diesel to liquefied gaseous fuel of the liquid fuel mixture that is supplied to the second stage of the mixed fuel supply system at a ratio of between 10% and 50% parts per mass diesel to 90% and 50% parts per mass liquefied gaseous fuel; the mixed fuel supply system comprises a fuel mixer and a diesel delivery line and a liquid gaseous fuel delivery line that are connected between the fuel mixer and a diesel reservoir and a liquefied gaseous fuel reservoir respectively; and the mixed fuel supply system comprises a variable speed controlled pump inline the diesel delivery line and a variable speed controlled pump inline the liquid gaseous fuel delivery.

14. The dual fuel supply system as claimed in claim 13 wherein the mixed fuel supply system includes a diesel pressure accumulator inline the diesel delivery line and a liquefied gaseous fuel pressure accumulator inline the liquid gaseous fuel delivery line.

15. The dual fuel supply system as claimed in claim 14, wherein the mixed fuel supply system includes a diesel booster pump inline the diesel delivery fine located before the diesel enters the diesel pressure accumulator, and a liquefied gaseous fuel booster pump inline the liquid gaseous fuel delivery line located before the liquid gaseous fuel enters the liquefied gaseous fuel pressure accumulator;
the mixed fuel supply system includes a proportioning valve inline the diesel delivery line and located after the diesel pressure accumulator and a proportioning valve inline the liquid gaseous fuel delivery line and located after the liquefied gaseous fuel pressure accumulator; and
the mixed fuel supply system includes a fuel cooler inline the diesel delivery fine and a fuel cooler inline the liquid gaseous fuel delivery line.

16. The dual fuel supply system as claimed in claim 2, wherein the diesel supply system includes a diesel supply line connected inline with the fuel rail of the indirect-injection system;
   the diesel supply system includes at least one fuel cooler inline the diesel supply line and located before the indirect injection-system; and
   the diesel supply system includes a diesel booster pump inline the diesel supply line and located before the fuel cooler.

17. The dual fuel supply system as claimed in claim 2, wherein the controller is configured to flush the mixed fuel supply line before switching over from the mixed fuel supply system to the diesel supply system; the controller is configured to flush the mixed fuel supply line with diesel after the mixed fuel supply system charged the second stage of the mixed fuel supply system with liquid fuel mixture; the controller is configured to flush the mixed fuel supply line with diesel before the diesel engine is stopped; the controller is configured to regulate the flow rate of the fuel mixture through the at least one fuel cooler in the mixed fuel supply line to regulate the temperature of the fuel mixture; and the controller is configured to regulate the changeover from the mixed fuel supply system to the diesel supply system when the pressure in the mixed fuel supply line drops below a set pressure threshold.

18. The dual fuel supply system as claimed in claim 17, wherein the controller is configured to alter the ratio of diesel to liquefied gaseous fuel to alter the vapor temperature of the fuel mixture at the supply pressure.

\* \* \* \* \*